US011393207B1

(12) United States Patent
Goldenberg et al.

(10) Patent No.: US 11,393,207 B1
(45) Date of Patent: Jul. 19, 2022

(54) MULTI-VIDEO ANNOTATION

(71) Applicant: Amazon Technologies, Inc., Seattle, WA (US)

(72) Inventors: Roman Goldenberg, Haifa (IL); Gerard Guy Medioni, Seattle, WA (US); Ofer Meidan, Hadera (IL); Ehud Benyamin Rivlin, Haifa (IL); Dilip Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 16/983,454

(22) Filed: Aug. 3, 2020

Related U.S. Application Data

(63) Continuation of application No. 16/291,632, filed on Mar. 4, 2019, now Pat. No. 10,733,450, which is a continuation of application No. 15/474,946, filed on Mar. 30, 2017, now Pat. No. 10,223,591.

(51) Int. Cl.
*G06V 20/40* (2022.01)
*H04N 5/232* (2006.01)
*H04N 7/18* (2006.01)
*H04N 5/77* (2006.01)
(Continued)

(52) U.S. Cl.
CPC ............. *G06V 20/41* (2022.01); *G06V 20/46* (2022.01); *G06V 20/52* (2022.01); *G06V 30/194* (2022.01); *H04N 5/23293* (2013.01); *H04N 5/77* (2013.01); *H04N 7/181* (2013.01)

(58) Field of Classification Search
CPC ...... G06V 20/41; G06V 30/194; G06V 20/52; G06V 20/46; H04N 5/23293; H04N 5/77; H04N 7/181
See application file for complete search history.

(56) References Cited

U.S. PATENT DOCUMENTS

| 4,825,232 | A | 4/1989 | Howdle |
| 7,050,110 | B1 | 5/2006 | Lienhart et al. |
| 7,225,980 | B2 | 6/2007 | Ku et al. |

(Continued)

OTHER PUBLICATIONS

Sohaib Khan, Consistent Labelling of Tracked Objects in Multiple Cameras with Overlapping Fields of View, Oct. 2003, IEEE Transactions on Pattern Analysis and Machine Intelligence, vol. 25, No. 10, pp. 1355-1360. (Year: 2003).*

(Continued)

*Primary Examiner* — Brenda C Bernardi
(74) *Attorney, Agent, or Firm* — Athorus, PLLC

(57) ABSTRACT

Multiple video files that are captured by calibrated imaging devices may be annotated based on a single annotation of an image frame of one of the video files. An operator may enter an annotation to an image frame via a user interface, and the annotation may be replicated from the image frame to other image frames that were captured at the same time and are included in other video files. Annotations may be updated by the operator and/or tracked in subsequent image frames. Predicted locations of the annotations in subsequent image frames within each of the video files may be determined, e.g., by a tracker, and a confidence level associated with any of the annotations may be calculated. Where the confidence level falls below a predetermined threshold, the operator may be prompted to delete or update the annotation, or the annotation may be deleted.

20 Claims, 22 Drawing Sheets

(51) Int. Cl.
*G06V 20/52* (2022.01)
*G06V 30/194* (2022.01)

(56) References Cited

U.S. PATENT DOCUMENTS

| | | |
|---|---|---|
| 7,663,661 B2 | 2/2010 | Vallone et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,213,689 B2 | 7/2012 | Yagnik et al. |
| 8,423,431 B1 | 4/2013 | Rouaix et al. |
| 8,630,924 B2 | 1/2014 | Groenevelt et al. |
| 8,688,598 B1 | 4/2014 | Shakes et al. |
| 9,191,633 B2 | 11/2015 | Fujimatsu et al. |
| 9,208,226 B2 | 12/2015 | Park et al. |
| 9,251,599 B2 | 2/2016 | Hirasawa et al. |
| 9,473,747 B2 | 10/2016 | Kobres et al. |
| 9,727,786 B2 | 8/2017 | Lee et al. |
| 9,760,970 B2 | 9/2017 | Abeykoon et al. |
| 9,818,451 B1 | 11/2017 | Tyagi et al. |
| 2003/0002712 A1 | 1/2003 | Steenburgh et al. |
| 2004/0181467 A1 | 9/2004 | Raiyani et al. |
| 2004/0257441 A1 | 12/2004 | Pevear et al. |
| 2007/0211145 A1 | 9/2007 | Kilian et al. |
| 2008/0055087 A1 | 3/2008 | Horii et al. |
| 2008/0059872 A1 | 3/2008 | Tseng et al. |
| 2008/0077511 A1 | 3/2008 | Zimmerman |
| 2008/0109114 A1 | 5/2008 | Orita et al. |
| 2008/0129825 A1 | 6/2008 | DeAngelis et al. |
| 2009/0121017 A1 | 5/2009 | Cato et al. |
| 2009/0245573 A1 | 10/2009 | Saptharishi et al. |
| 2009/0319883 A1 | 12/2009 | Mei et al. |
| 2011/0011936 A1 | 1/2011 | Morandi et al. |
| 2012/0284132 A1 | 11/2012 | Kim et al. |
| 2013/0076898 A1 | 3/2013 | Philippe et al. |
| 2013/0253700 A1 | 9/2013 | Carson et al. |
| 2014/0279294 A1 | 9/2014 | Field-Darragh et al. |
| 2014/0333775 A1 | 11/2014 | Naikal et al. |
| 2014/0347475 A1 | 11/2014 | Divakaran et al. |
| 2014/0362223 A1 | 12/2014 | LaCroix et al. |
| 2015/0019391 A1 | 1/2015 | Kumar et al. |
| 2015/0073907 A1 | 3/2015 | Purves et al. |
| 2015/0294159 A1 | 10/2015 | Takahashi |
| 2015/0304612 A1 | 10/2015 | Richards et al. |
| 2016/0214534 A1 | 7/2016 | Richards et al. |
| 2016/0262631 A1 | 9/2016 | Shen |
| 2016/0275642 A1 | 9/2016 | Abeykoon et al. |
| 2016/0295208 A1 | 10/2016 | Beall |
| 2017/0053169 A1 | 2/2017 | Cuban et al. |
| 2017/0275023 A1 | 9/2017 | Harris et al. |
| 2018/0054604 A1 | 2/2018 | Boyd et al. |
| 2018/0136332 A1 | 5/2018 | Barfield et al. |
| 2018/0173245 A1 | 6/2018 | Twining et al. |
| 2020/0012943 A1 | 1/2020 | Neves et al. |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

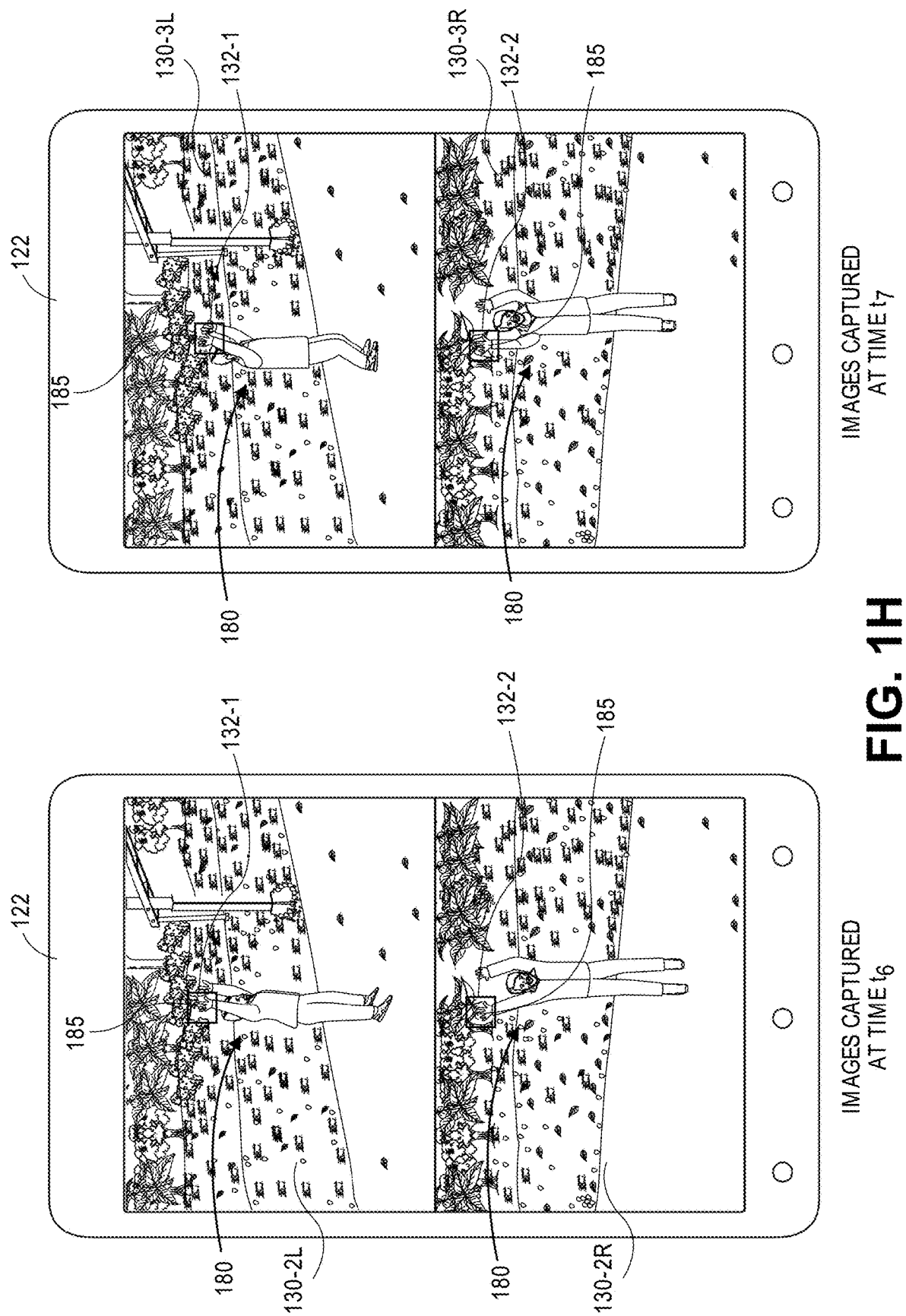

| Frame No. | Time Stamp | Coordinates of Object | | | | | Frame No. | Time Stamp | Coordinates of Object | | | |
|---|---|---|---|---|---|---|---|---|---|---|---|---|
| | | x | y | x | y | | | | x | y | x | y |
| 130-1R | 03:08:11.2 | 2628 | 1999 | 2788 | 1999 | | 130-1L | 03:08:11.2 | 2202 | 1651 | 2389 | 1651 |
| | | 2628 | 1879 | 2788 | 1879 | | | | 2202 | 1371 | 2389 | 1371 |
| 130-2R | 03:08:11.4 | 2645 | 2019 | 2805 | 2019 | | 130-2L | 03:08:11.4 | 2218 | 1662 | 2398 | 1662 |
| | | 2645 | 1899 | 2805 | 1899 | | | | 2218 | 1368 | 2398 | 1368 |
| 130-3R | 03:08:11.6 | 2631 | 2036 | 2791 | 2036 | | 130-3L | 03:08:11.6 | 2239 | 1691 | 2414 | 1691 |
| | | 2631 | 1916 | 2791 | 1916 | | | | 2239 | 1399 | 2414 | 1399 |
| 130-4R | 03:08:11.8 | 2622 | 2051 | 2882 | 2051 | | 130-4L | 03:08:11.8 | 2206 | 1703 | 2381 | 1703 |
| | | 2622 | 1931 | 2882 | 1931 | | | | 2206 | 1414 | 2381 | 1414 |
| 130-5R | 03:08:12.0 | 2673 | 2188 | 2933 | 2188 | | 130-5L | 03:08:12.0 | 2189 | 2184 | 2360 | 2184 |
| | | 2673 | 2068 | 2933 | 2068 | | | | 2189 | 1893 | 2360 | 1893 |
| 130-6R | 03:08:12.2 | 2619 | 2117 | 2879 | 2117 | | 130-6L | 03:08:12.2 | 2208 | 2171 | 2384 | 2171 |
| | | 2619 | 1997 | 2879 | 1997 | | | | 2208 | 1880 | 2384 | 1880 |
| 130-7R | 03:08:12.4 | 2622 | 2094 | 2882 | 2094 | | 130-7L | 03:08:12.4 | 2206 | 2096 | 2383 | 2096 |
| | | 2622 | 1974 | 2882 | 1974 | | | | 2206 | 1801 | 2383 | 1801 |
| ..... | ..... | ..... | ..... | ..... | ..... | | ..... | ..... | ..... | ..... | ..... | ..... |

MULTI-VIDEO ANNOTATION

CROSS-REFERENCE TO RELATED APPLICATIONS

This application is a continuation of U.S. patent application Ser. No. 16/291,632, filed Mar. 4, 2019, which is a continuation of U.S. patent application Ser. No. 15/474,946, now U.S. Pat. No. 10,223,591, filed Mar. 30, 2017. The contents of each of these applications are incorporated by reference herein in their entirety.

BACKGROUND

In computer vision applications, annotation is commonly known as the marking or labeling of images or video files captured from a scene, such as to denote the presence and location of one or more objects or other features within the scene in the images or video files. Annotating a video file typically involves placing a virtual marking such as a box or other shape on an image frame of a video file, thereby denoting that the image frame depicts an item, or includes pixels of significance, within the box or shape. Other methods for annotating a video file may involve applying markings or layers including alphanumeric characters, hyperlinks or other markings on specific frames of a video file, thereby enhancing the functionality or interactivity of the video file in general, or of the video frames in particular. Two common reasons for annotating video files are to validate computer vision algorithms, e.g., to compare an actual location of an item appearing in a video file to a location of the item as determined by one or more of such algorithms, and also to train computer vision algorithms, e.g., to feed an actual location of an item within an image frame to a computer vision algorithm in order to train the computer vision algorithm to recognize that the item is in that location in the image frame.

Traditional manual and automatic methods for annotating video files have a number of limitations, however. First, annotating a video file is very time-consuming for a human, who must visibly recognize the location of an item in a visual image frame and also annotate an appropriately sized box or other shape around the item within the visual image frame. Next, most automatic methods for annotating a video file are computationally expensive, in that automatic video annotation typically requires feeding an algorithm with a number of positive examples of an object of interest to be recognized within a video file (e.g., a specific body part, a specific commercial good, a specific license plate or other object that is to be recognized within the video file, along with specific locations of the object within the video file), and also a number of negative examples of the object of interest (e.g., items that are visibly distinct from the specific body part, the commercial good, license plate or other object, or a confirmation that a given image frame does not include the target object). Such automatic methods may require an intense amount of data and processing power, however, in order to optimize their chances of success. For example, a ten-minute video file that was captured at a rate of thirty frames per second includes 18,000 image frames, each of which must be specifically marked with locations of objects of interest depicted therein, or designated as not depicting any such objects.

Manual and automatic methods for video annotation are particularly limited in environments where a number of imaging devices (e.g., digital cameras) are aligned to capture imaging data from a single scene. In such environments, the manual labor and/or processing power that may be required in order to properly annotate video files captured by each of such devices is exponentially increased.

BRIEF DESCRIPTION OF THE DRAWINGS

FIGS. 1A through 1I are views of aspects of one system for annotating multiple video files in accordance with implementations of the present disclosure.

DETAILED DESCRIPTION

As is set forth in greater detail below, the present disclosure is directed to the annotation of multiple video files. More specifically, one or more implementations of the present disclosure are directed to receiving designations of regions of interest within one or more video files captured from a scene by calibrated imaging devices over a period of time, and transposing data corresponding to such regions of interest into video files captured from the scene by other calibrated imaging devices within the same period of time. The video files may be synchronized, e.g., in real time as the digital images are captured or at a later time, and stamped or otherwise labeled with times (e.g., time stamps) at which the individual image frames of the video files were captured. One or more of the image frames of the video files may be displayed on a user interface, and a human operator may manually designate a region of interest within an image frame, using a mouse, a touchscreen or another input/output device. An object of interest represented within a region of interest designated by a human operator may be identified by a tracking algorithm, and the appearance of the object of interest may be learned based on the regions of interest designated by the human operator. Because the imaging devices are calibrated, the region of interest may be projected or otherwise replicated in planes of image frames captured by the other calibrated imaging devices in order to automatically designate other regions of interest within such planes, and such other regions of interest may be searched for the object of interest therein, e.g., according to one or more tracking algorithms. The regions of interest may be recognized and tracked within successively captured image frames, and the position of the object of interest within such frames may be predicted. Where a confidence level associated with the regions of interest is low, or where an object of interest appearing within one or more of the regions of interest is determined to be obscured or to have departed a scene, the human operator may be prompted to update, delete or relocate the region of interest from a given image frame.

Figure 1A:
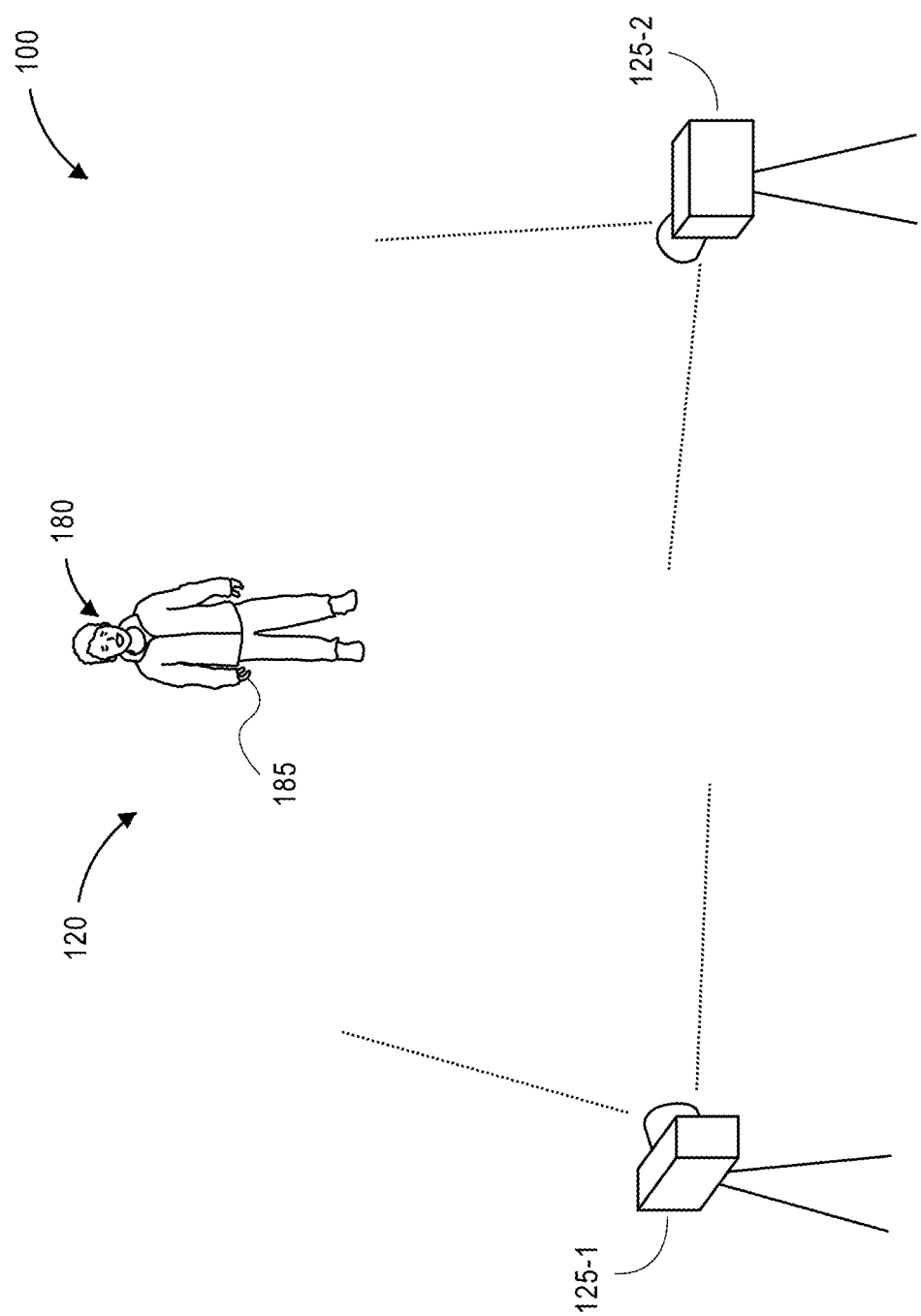

Referring to FIGS. 1A through 1I, views of aspects of one system 100 for annotating multiple video files in accordance with implementations of the present disclosure are shown. As is shown in FIG. 1A, the system 100 includes a scene 120 having a pair of imaging devices 125-1, 125-2 (e.g., digital cameras) and an actor 180. The scene 120 may be any open or enclosed environment or space in which any number of actors (e.g., humans, other animals or machines) may execute one or more poses, gestures or other actions within the fields of view of the imaging devices 125-1, 125-2. Additionally, the imaging devices 125-1, 125-2 are calibrated, such that mappings between coordinates of imaging data captured by such cameras and directions relative to their respective image sensors are known. The imaging devices 125-1, 125-2 are aligned with fields of view that overlap over at least in part over a portion of the scene 120, and are configured to capture data in the form of visual images (e.g., color images, such as red-green-blue images, or "RGB" images) and/or depth images (e.g., depth data or ranging data) from objects within their respective fields of view, such as still or moving images. As is shown in FIG. 1A, an actor 180 is executing one or more poses or gestures in the scene 120, within the respective fields of view of each of the imaging devices 125-1, 125-2.

Figure 1B:
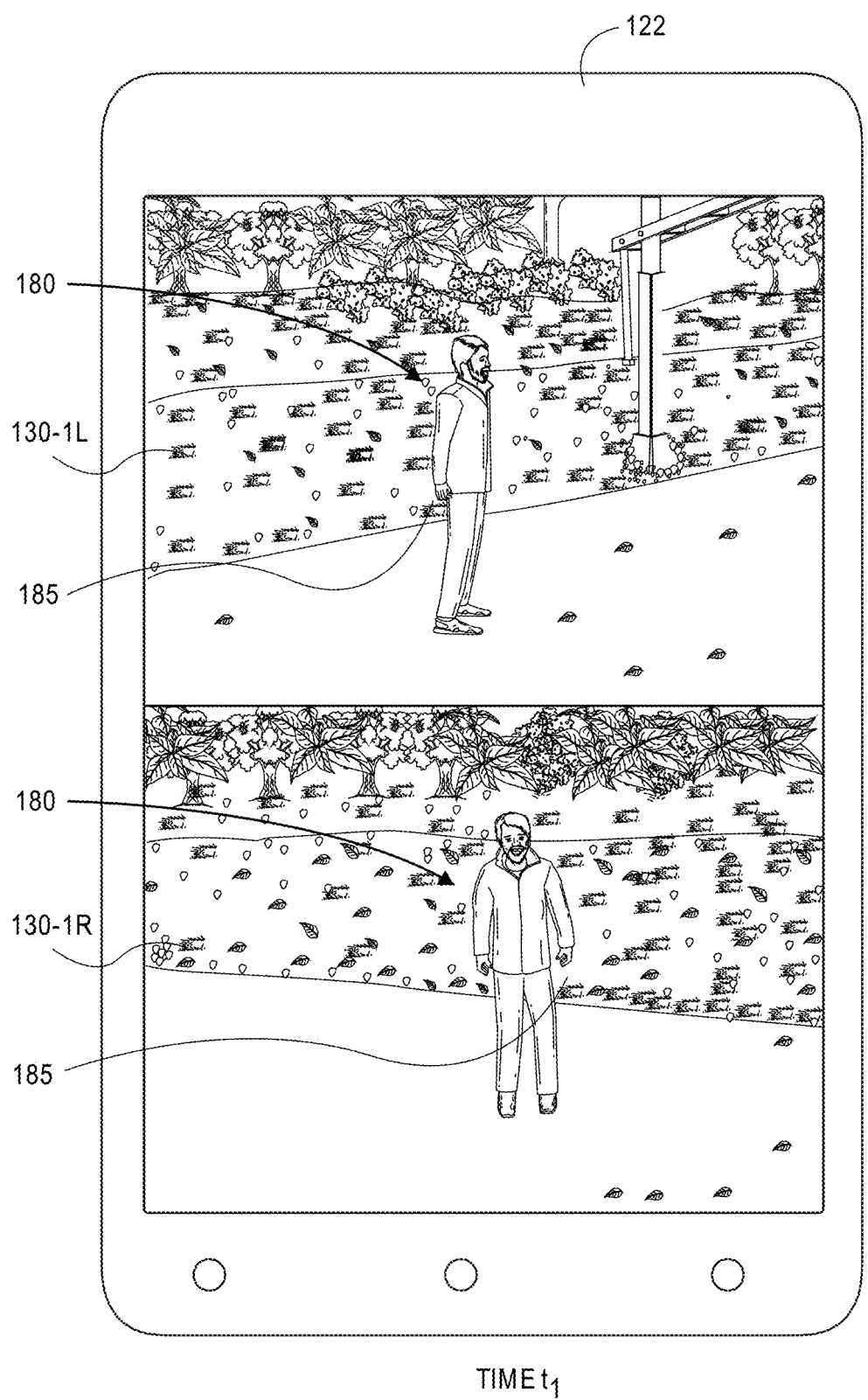

As is shown in FIG. 1B, a pair of image frames 130-1L, 130-1R captured from the scene by the imaging devices 125-1, 125-2 at a time $t_1$ are displayed on a computer device 122 (e.g., a tablet computer). The image frames 130-1L, 130-1R depict the actor 180 from the fields of view of the imaging devices 125-1, 125-2, respectively.

Figure 1C:
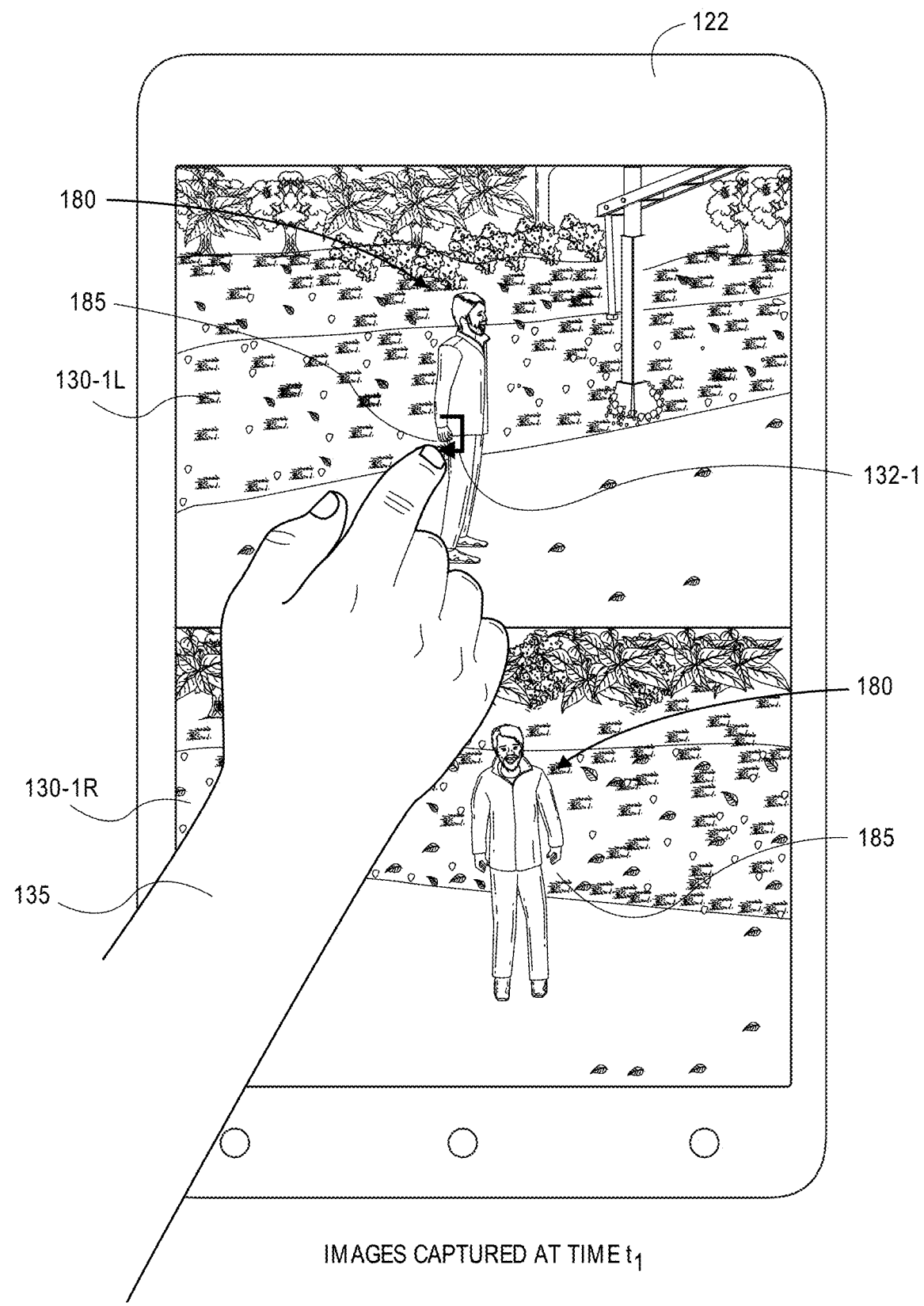
Figure 1D:
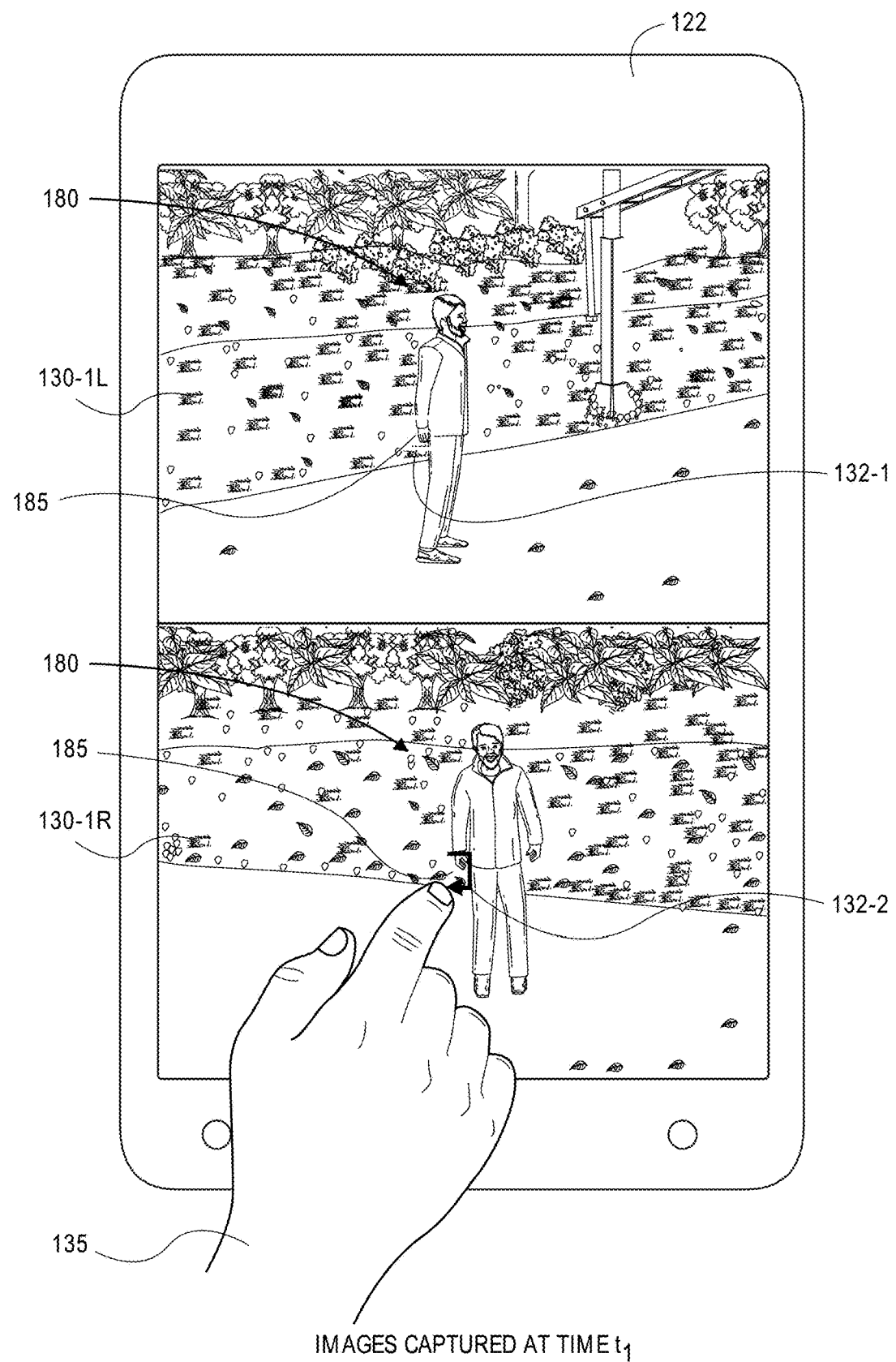

In accordance with the present disclosure, an operator may select or identify a portion of a video image frame captured by an imaging device aligned to capture imaging data from a scene, and data corresponding to the portion of the video image frame may be transposed or projected into video image frames captured by other imaging devices that are aligned to capture imaging data from the scene. As is shown in FIG. 1C, an operator 135 selects a portion 132-1 of the video image frame 130-1L corresponding to a right hand 185 of the actor 180. The video image frame 130-1L was captured from a left view of the scene 120 at time $t_1$ using the imaging device 125-1. For example, in some implementations, the operator 135 may contact a touchscreen in a region corresponding to the portion 132-1, and may define the portion 132-1 by executing a gesture on the touchscreen defining a shape (e.g., a box), such as is shown in FIG. 1C, or, alternatively, one or more alphanumeric characters or symbols. In other implementations, the operator 135 may select the portion 132-1 by a single contact with a touchscreen or other display, or a user interface rendered thereon, and the portion 132-1 may be defined by a radius or buffer (e.g., a predetermined distance or a predetermined number of pixels) extending from the point of the single contact. In some other implementations, the operator 135 may select the portion 132-1 by dragging a mouse or other pointer on the user interface, or by entering information regarding the portion 132-1 or the right hand 185 using a keyboard or other input device. Similarly, as is shown in FIG. 1D, the operator 135 selects a portion 132-2 of the video image frame 130-1R corresponding to the right hand 185 of the actor 180. The video image frame 130-1R was captured from a right view of the scene 120 at the time $t_1$ using the imaging device 125-2.

Figure 1E:
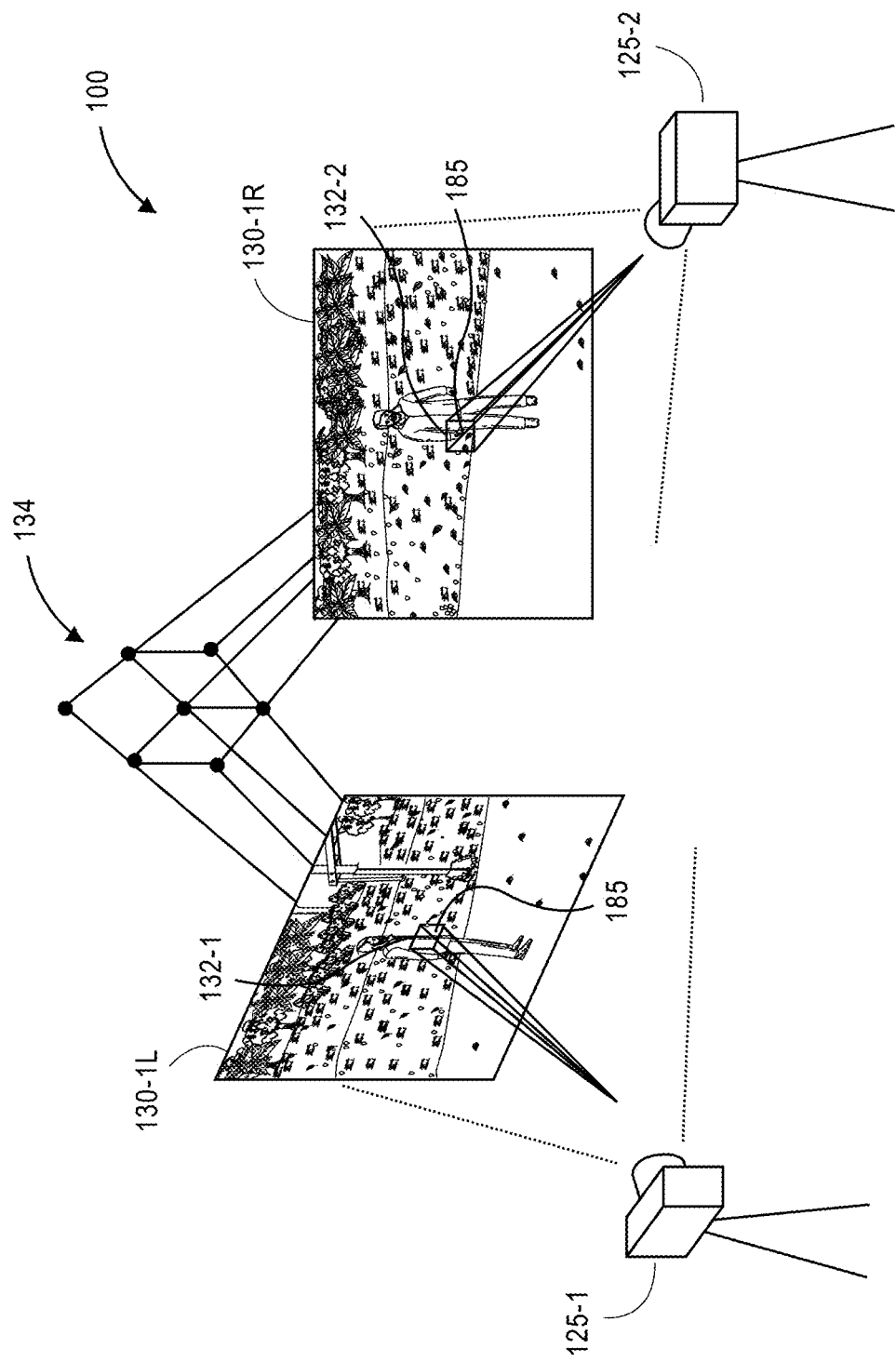

As is shown in FIG. 1E, after the portions 132-1, 132-2 surrounding the right hand 185 have been designated by the operator 135, data corresponding to the portions 132-1, 132-2 may be transposed into video image frames that were subsequently captured from the scene 120 at later times using the imaging devices 125-1, 125-2. For example, as is shown in FIG. 1E, rays may be virtually extended from a position of an image sensor of the imaging device 125-1 to and through vertices or other points (e.g., points corresponding to a boundary or perimeter or perimeter) of the portion 132-1 selected by the operator 135 in the plane of the image frame 130-1L, and from a position of an image sensor of the imaging device 125-2 to and through vertices or other points (e.g., points corresponding to a boundary or perimeter) of the portion 132-2 selected by the operator 135 in the plane of the image frame 130-1R.

Points within the region bounded by such rays may define a region 134 corresponding to or including a position of the right hand 185 of the actor 180 in three-dimensional space. In some implementations, shapes of the portions 132-1, 132-2 may be defined by the operator 135, and a shape of the region 134 may depend on any other factor, including but not limited to the geometric configuration of the rays extending from the imaging devices 125-1, 125-2 from which the region 134 was defined, and the points in three-dimensional space at which such rays intersect. In some implementations, the shape of the region 134 may be selected by the operator 135, as well. A position of the right hand 185 in three-dimensional space may be learned based on the positions of the intersections of the rays extending to and through the vertices or other points (e.g., points corresponding to a boundary or perimeter) of the portions 132-1, 132-2, and aspects of the external appearance of the right hand 185 may be determined (e.g., colors, textures, outlines and/or other aspects) accordingly.

After the portions 132-1, 132-2 of the image frames 130-1L, 130-1R have been selected by the operator 135, and the region 134 in three-dimensional space has been defined based on rays extending from the imaging devices 125-1, 125-2 through vertices or other points (e.g., points corresponding to boundaries or perimeters) of such portions 132-1, 132-2, the right hand 185 of the actor 180 may be tracked within image frames subsequently captured by the imaging devices 125-1, 125-2 over a period of time. For example, the interior contents of each of the portions 132-1, 132-2 may be analyzed to recognize any colors, textures, outlines and/or other aspects of objects within the portions 132-1, 132-2, such as the right hand 185 of the actor 180. Information regarding such colors, textures, outlines or other aspects may then be recorded and used to search for colors, textures, outlines or aspects within the region 134 of the image frame 130-1L that correspond to the right hand 185 of the actor 180.

Figure 1F:
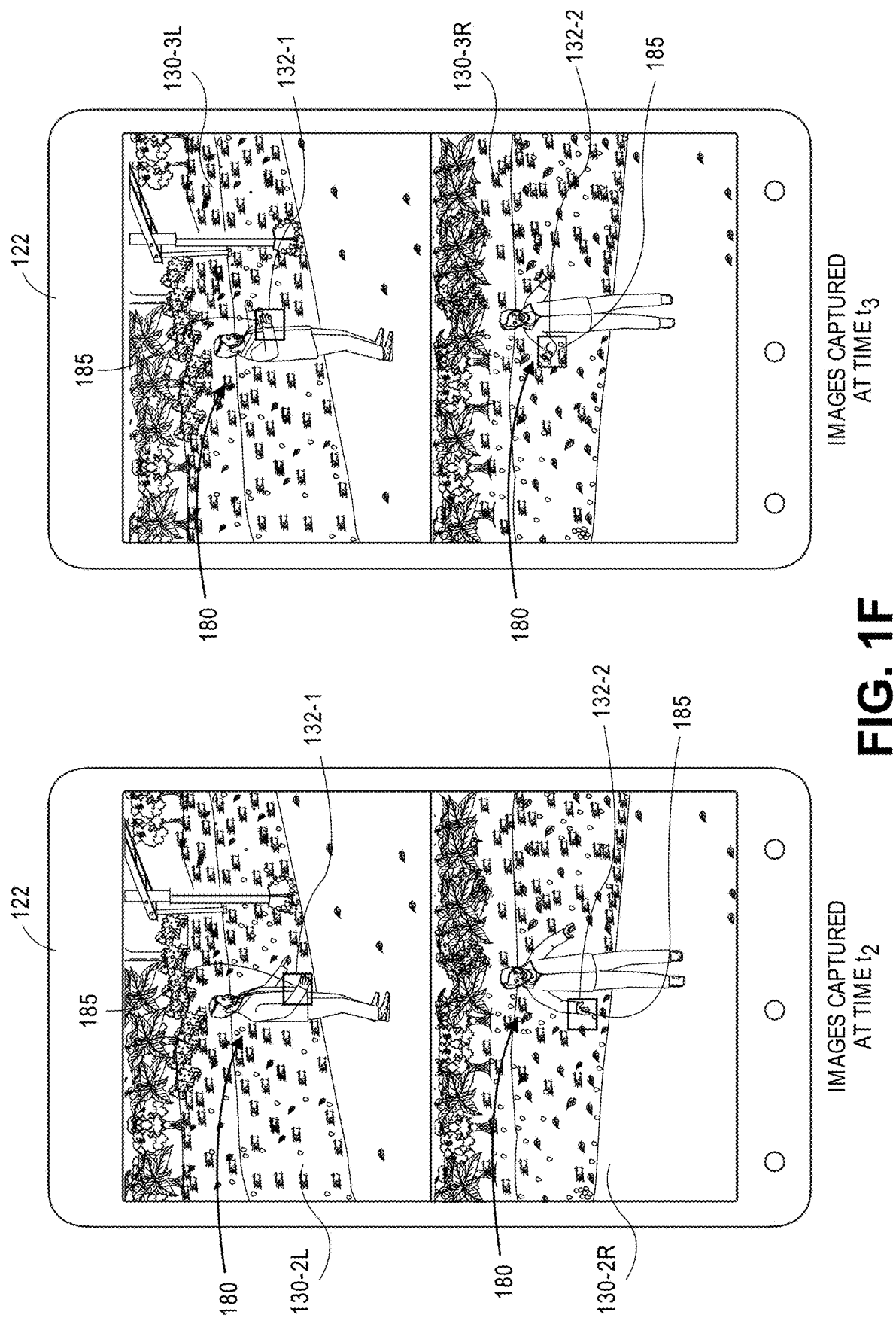
Figure 1G:
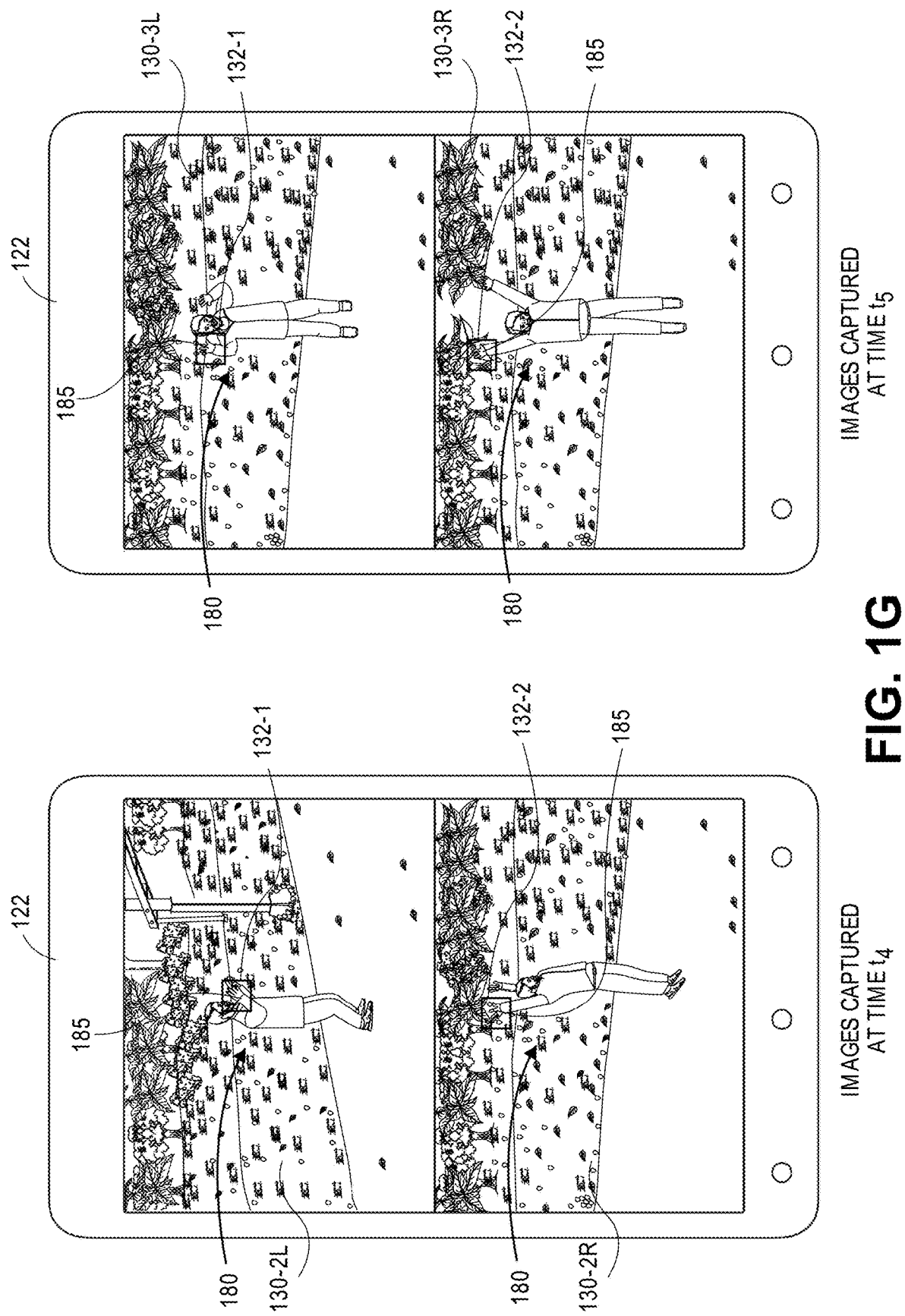

As is discussed above, once the appearance of the right hand 185 (e.g., one or more colors, textures, outlines or other aspects thereof) has been learned based on the portions 132-1, 132-2 of the images 130-1L, 130-1R selected by the operator 135, aspects of the appearance of the right hand 185 (e.g., the colors, textures, outlines or other aspects) may be tracked in succeeding image frames. As is shown in FIG. 1F, the portions 132-1, 132-2 are shown as surrounding the right hand 185 depicted in image frames 130-2L, 130-2R that were captured at time $t_2$ and in image frames 130-3L, 130-3R that were captured at time $t_3$. Similarly, as is shown in FIGS. 1G and 1H, the portions 132-1, 132-2 are shown as surrounding the right hand 185 depicted in image frames 130-4L, 130-4R, 130-5L, 130-5R, 130-6L, 130-6R, 130-7L, 130-7R that were captured at times $t_4$, $t_5$, $t_6$ and $t_7$.

The right hand 185 may be tracked within the visual image frames, e.g., from frame-to-frame, using any number of tracking algorithms or systems. In some implementations, a kernelized correlation filter (or "KCF") tracker may predict an appearance of the right hand 185 in a current visual image frame based on learned appearances of the right hand 185 determined from previous visual image frames. Such algorithms or systems may operate on a centralized server or other computer device, or by one or more external or distributed computer devices, including but not limited to the computer device 122, or one or more computer processors operating on one or more of the imaging devices 125-1, 125-2.

In the event that pixels corresponding to the contents of one or more of the portions 132-1, 132-2 drifts out of the fields of view of the imaging devices 125-1, 125-2, e.g., as evidenced in the image pixels of one or more of the image frames 130-2L, 130-2R, 130-3L, 130-3R, 130-4L, 130-4R, 130-5L, 130-5R, 130-6L, 130-6R, 130-7L, 130-7R, the operator 135 may be prompted to update, delete or relocate one or more of the portions 132-1, 132-2 within a given image frame, such as by executing another gesture on a touchscreen of the computer device 122, or otherwise redefining or removing the portions 132-1, 132-2 from the respective image frames. In some implementations, scores representative of confidence levels associated with the right hand 185 and the portions 132-1, 132-2 with respect to an item of interest may be calculated accordingly. Values of such scores may be used to determine whether the operator 135 should be prompted to update, delete or relocate one or more of the portions 132-1, 132-2, or whether one or more of such portions 132-1, 132-2 should be automatically redefined or removed therefrom.

As is shown in FIG. 1I, based on the tracking of the portions 132-1, 132-2 within the respective image frames, a data record 140 including parameters indicative of the tracked positions of the left hand 185 within the respective portions 132-1, 132-2 within the image frames may be generated. The data record 140 identifies a summary of the specific image frames 130-2L, 130-2R, 130-3L, 130-3R, 130-4L, 130-4R, 130-5L, 130-5R, 130-6L, 130-6R, 130-7L, 130-7R in which the left hand 185 was located within the portions 132-1, 132-2, as well as coordinates within the image frames where the left hand 185 was located (e.g., at least one coordinate pair corresponding to the left hand 185), and times (e.g., time stamps) at which such image frames were captured. Alternatively, the data record 140 may also include data describing one or more lines or line segments corresponding to points, vertices and/or boundaries or perimeters of the portions 132-1, 132-2 in each of the image frames 130-2L, 130-2R, 130-3L, 130-3R, 130-4L, 130-4R, 130-5L, 130-5R, 130-6L, 130-6R, 130-7L, 130-7R, or any other parameters associated with the left hand 185 and/or the portions 132-1, 132-2, including but not limited to parameters regarding any colors, textures, outlines or other aspects of the left hand 185 or the portions 132-1, 132-2.

Annotating video files is a time-consuming task, particularly when the files to be annotated are large in number, at least because annotation typically requires a human operator to manually designate a bounding region (or other region of interest) within each image frame of a video file. For example, where identifying locations in which a cat appears within a video file is desired, a bounding region must be formed around image pixels corresponding to the cat in each frame in which the cat appears. The task of annotating video files is particularly burdensome where multiple imaging devices are aligned to capture imaging data from a common scene. For example, where a set of a dozen digital cameras are aligned to capture imaging data regarding a cat within a scene, a human operator must typically form a bounding region around image pixels corresponding to the cat in each frame in which the cat appears, and for each of the dozen video files captured by each of the dozen cameras. While a human operator could annotate each of the dozen video files in parallel, experiments have shown that viewing all video files captured by all of the cameras, in an unstructured form, imposes a high cognitive load upon a human operator that can have a deleterious effect on both the per-frame annotation rate, and the total net time that is required in order to complete the task of annotation.

Accordingly, the systems and methods of the present disclosure are directed to the annotation of multiple video files captured from a scene by calibrated imaging devices (e.g., digital cameras). Because manual annotation is labor-intensive, and because traditional methods for automatic annotation are computationally expensive, one or more implementations of the present disclosure rely on the calibrated relationship of multiple imaging devices to propagate annotations made to video frames captured by one of the imaging devices into video frames captured by other imaging devices. Video image frames may be presented to an operator, e.g., along with one or more controllers or other features, and the operator may select one or more regions of interest by designating portions of one or more of the image frames. Data representing the designated portions may then be transposed to each of the other video image files within which the one or more region of interests, or objects therein, remain present.

Additionally, a tracking algorithm may be trained to track an annotation made in an image frame by a human operator, or the subject matter within the annotation, in subsequently captured video frames, e.g., by recognizing an object within an annotation, and predicting an appearance of the object in subsequently captured frames. The processes by which annotation data is transposed to one or more video files captured using multiple imaging devices may be repeated, as necessary, as long as an object of interest that is the subject of the annotation remains present on a scene. Additionally, a human operator may manually revise one or more annotations, as necessary. Confidence levels may be determined for each of the annotations made by a human operator, or replicated in other video image frames. An annotation may be updated, deleted or relocated (or a human operator may be prompted to update, delete or relocate the annotation), as necessary, based on the confidence level. Moreover, some implementations of the present disclosure may reduce groups of imaging devices under consideration to groups of similar imaging devices, e.g., imaging devices of the same or similar types, or imaging devices having similarly aligned fields of view, and may transpose annotation data to each of imaging device under consideration, or to only one or more groups of similar imaging devices.

A record of annotations made in image frames, or annotations that are replicated in other image frames, may be maintained and subsequently used for any purpose. For example, annotation data may be used to validate an output of a computer vision algorithm (such as to compare an actual location of an item shown in a video file to a location of the item as determined by a computer vision algorithm), or to train a computer vision algorithm (e.g., to feed an actual location of an item within an image frame to the algorithm in order to train the computer vision algorithm to recognize that the item is in that location in the image frame).

Those of ordinary skill in the pertinent arts will recognize that imaging data, e.g., visual imaging data, depth imaging data, infrared imaging data, radiographic imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

The systems and methods of the present disclosure are directed to simultaneously annotating multiple video files captured by multiple calibrated imaging devices (e.g., digital cameras). In some implementations, the systems and methods disclosed herein may be used to receive selections of regions of interest in video files captured from a scene, and to replicate such regions of interest in other video files captured from the scene. For example, a human operator may identify a set of image pixels, e.g., pixels corresponding to an object of interest, in a visual image frame of a first video file that was captured at a particular time. Because the imaging devices are calibrated, mappings between coordinates of imaging data captured by such imaging devices and directions relative to their respective image sensors are known. Therefore, the set of pixels may be readily extrapolated to another visual image frame of a second video file that was captured at the same time, e.g., by triangulating the set of pixels with respect to the actual positions in space of objects depicted therein. Additionally, the contents of the sets of pixels may be analyzed to recognize any colors, textures, outlines or aspects of objects depicted therein.

After an annotation to a video image frame captured by an imaging device has been made, and after the annotation has been replicated in other video image frames captured by other imaging devices at the same time, each of the annotations may be tracked within successive video image frames by one or more tracking algorithms or systems, including but not limited to tracking algorithm, e.g., an Open Source Computer Vision (or OpenCV) tracker or a KCF tracker, that may predict an appearance of the annotations or objects associated with the annotations in subsequently captured visual image frames based on the appearances of the annotations or objects in previously captured visual image frames. Two or more of the subsequently captured visual image frames may be displayed simultaneously on a common user interface, and an operator may update, delete or relocate an annotation in any image frame. In some implementations, an operator may be prompted to update, delete or relocate an annotation in an image frame where a confidence level associated with the annotation or an associated object falls below a predetermined threshold, or where a tracker determines that the annotation or the associated object has departed from the fields of view of each of the imaging devices under consideration. In some implementations, an annotation may be automatically updated, deleted or relocated, as necessary.

In some implementations, a data record indicative of the positions of the respective annotations within each of the image frames may be generated. Such a data record may identify a summary of the image frames in which the annotations were located, as well as coordinate pairs corresponding to one or more of the annotations within the image frames, and times (e.g., time stamps) at which such image frames were captured. Thus, the data record may represent a complete account of the presence of an annotation, or an object associated with the annotation, within video files captured by a number of imaging devices over a defined time period.

Figure 2:
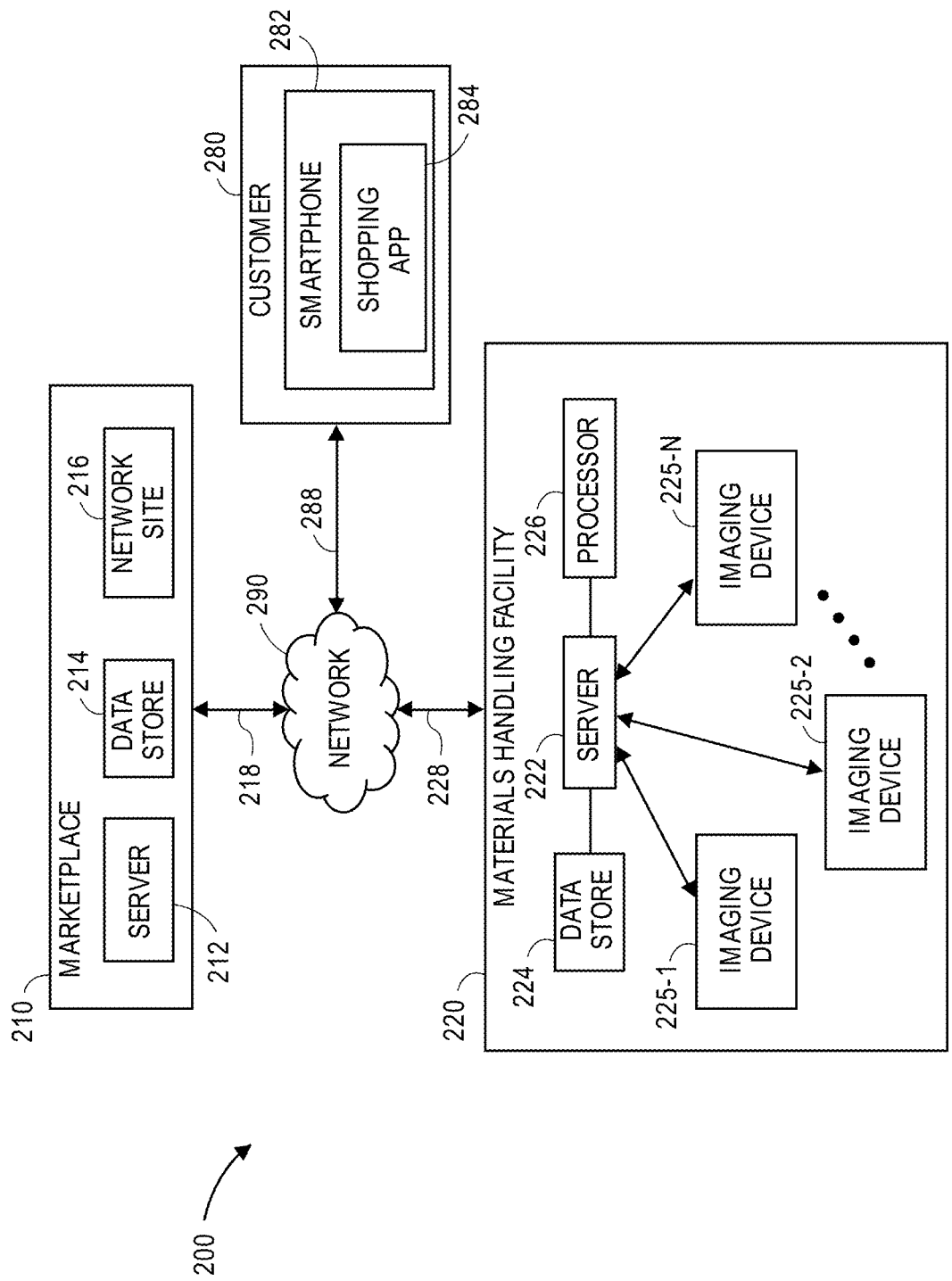
FIG. 2 is a block diagram of components of one system for annotating multiple video files in accordance with implementations of the present disclosure.

Referring to FIG. 2, a block diagram of components of one system 200 for annotating multiple video files in accordance with implementations of the present disclosure is shown. The system 200 includes a marketplace 210, a materials handling facility 220 and a customer (or actor, or worker, or other human operator) 280 that are connected to one another across a network 290, such as the Internet. Except where otherwise noted, reference numerals preceded by the number "2" shown in FIG. 2 indicate components or features that are similar to components or features having reference numerals preceded by the number "1" shown in FIGS. 1A through 1I.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores (e.g., databases) 214 for hosting a network site 216 (e.g., a web site). The marketplace 210 may be physically or virtually associated with one or more materials handling facilities, including but not limited to the materials handling facility 220. The network site 216 may be implemented using the one or more servers 212, which connect or otherwise communicate with the one or more data stores 214 as well as the network 290, as indicated by line 218, through the sending and receiving of digital data. The servers 212 may cause the display of information associated with the network site 216 in any manner, e.g., by transmitting code such as Hypertext Markup Language (HTML), over the network 290 to another computing device or resource that may be configured to generate and render the information into one or more pages or to cause a display of such pages on a computer display of any kind. Moreover, the data stores 214 may include any type of information regarding items that have been made available for sale through the marketplace 210, or ordered by customers (e.g., the customer 280) from the marketplace 210. The servers 212 may further execute any type of computer-based function or compute any type or form of calculation, including but not limited to any formulas, equations, algorithms or techniques for determining one or more probabilities or performing any number of statistical tests.

The materials handling facility 220 may be any facility that is adapted to receive, store, process and/or distribute items on behalf of the marketplace 210. The materials handling facility 220 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 220. Upon their arrival at the materials handling facility 220, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 220, inventory items that are listed in the request or order, or are desired by the user, may be selected or "picked" from an inventory area at the materials handling facility 220. For example, in one implementation, a customer or other user may travel through the materials handling facility 220 with a list (e.g., a paper list, or a handheld mobile device displaying or including such a list) and may pick one or more of the inventory items from an inventory area at the materials handling facility 220. In other implementations, an employee of the materials handling facility 220 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2, the materials handling facility 220 includes a networked computer infrastructure for performing various computer-related functions associated with the receipt, storage, processing and distribution of such items, including one or more physical computer servers 222, data stores (e.g., databases) 224 and processors 226, that may be provided in the same physical location as the materials handling facility 220, or in one or more alternate or virtual locations, e.g., in a "cloud"-based environment. In some implementations, the servers 222, the data stores 224 and/or the processors 226 or any number of other computing devices or resources may further execute any type of computer-based function or compute any type or form of calculation, including but not limited to any formulas, equations, algorithms or techniques for determining one or more probabilities or performing any number of statistical tests.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 220 may include one or more inventories having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 220 may further include one or more receiving stations featuring any apparatuses that may be required in order to receive shipments of items at the materials handling facility 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 220 may further include one or more distribution stations where items that have been retrieved from a designated inventory area may be evaluated, prepared and packed for delivery from the materials handling facility 220 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 220 may be transferred directly to a distribution station for further processing, or "cross-docked," without first being placed into storage in an intermediate inventory area. The materials handling facility 220 may also include one or more additional stations for receiving and distributing items to customers, as well as one or more conveying systems, autonomous mobile robots, or other manual or automated vehicles for transporting items between such stations or areas (not shown in FIG. 2). The materials handling facility 220 may operate one or more order processing and/or communication systems using computer devices or resources in communication with one or more of the servers 222, the data stores 224 and/or the processors 226, or through one or more other computing devices or resources that may be connected to the network 290, as is indicated by line 228, in order to transmit or receive information in the form of digital or analog data, or for any other purpose.

The imaging devices 225-1, 225-2 . . . 225-n may be any form of optical recording device that may be used to photograph or otherwise record imaging data of structures, facilities or any other elements within the materials handling facility 220, as well as any items within the materials handling facility 220, or for any other purpose. The imaging devices 225-1, 225-2 . . . 225-n may be mounted in any specific location or orientation within the materials handling facility 220, e.g., above, below or alongside one or more inventory areas or stations for receiving or distributing items.

The imaging devices 225-1, 225-2 . . . 225-n may include one or more sensors, memory or storage components and processors, and such sensors, memory components or processors may further include one or more photosensitive surfaces, filters, chips, electrodes, clocks, boards, timers or any other relevant features (not shown). The imaging devices 225-1, 225-2 . . . 225-n may capture imaging data in the form of one or more still or moving images of any kind or form, as well as any relevant audio signals or other information, within one or more designated locations within the materials handling facility 220. In some implementations, one or more of the imaging devices 225-1, 225-2 . . . 225-n may be configured to capture depth imaging data, e.g., distances or ranges to objects within their respective fields of view. In some implementations, one or more of the imaging devices 225-1, 225-2 . . . 225-n may be configured to capture visual imaging data, e.g., visual images or image frames in color, grayscale or black-and-white.

For example, one or more of the imaging devices 225-1, 225-2 . . . 225-n may be an RGB color camera, a still camera, a motion capture/video camera or any other type or form of camera. In other implementations, one or more of the imaging devices 225-1, 225-2 . . . 225-n may be depth-sensing cameras, such as a RGBD (or RGBz) camera. In still other implementations, one or more of the imaging devices 242 may be a thermographic or infrared (IR) camera. Additionally, in some implementations, the imaging devices 225-1, 225-2 . . . 225-n may simply be camera modules that include a lens and an image sensor configured to convert an optical image obtained using the lens of the camera into a digital signal or digital representation of the image (generally referred to herein as imaging data). In one implementation, the image sensor may be a RGB sensor capable of supporting an image resolution of at least 860×480 at six frames per second that may likewise be configured to provide image data to other components (e.g., a graphics processing unit) for processing. In some implementations, the imaging devices 225-1, 225-2 . . . 225-n may be paired to provide stereo imagery and depth information, and may include a pair of camera modules. Additionally, imaging data may be stored in any variety of formats including, but not limited to, YUYV, RGB, RAW, .BMP, JPEG, .GIF, or the like.

The imaging devices 225-1, 225-2 . . . 225-n may also include manual or automatic features for modifying their respective fields of view or orientations. For example, one or more of the imaging devices 225-1, 225-2 . . . 225-n may be configured in a fixed position, or with a fixed focal length (e.g., fixed-focus lenses) or angular orientation. Alternatively, one or more of the imaging devices 225-1, 225-2 . . . 225-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 225-1, 225-2 . . . 225-n, or changes in one or more of the angles defining the angular orientation.

For example, one or more of the imaging devices 225-1, 225-2 . . . 225-n may be hard-mounted to a support or mounting that maintains the device in a fixed configuration or angle with respect to one, two or three axes. Alternatively, however, one or more of the imaging devices 225-1, 225-2 . . . 225-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 225-1, 225-2 . . . 225-n may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of networks including one or more of the imaging devices 225-1, 225-2 . . . 225-n, e.g., digital cameras, may be affected based on the lighting conditions and characteristics of the scenes in which the imaging devices 225-1, 225-2 . . . 225-n are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the materials handling facility 220 of FIG. 2 includes boxes corresponding to three imaging devices 225-1, 225-2 . . . 225-n, those of ordinary skill in the pertinent arts will recognize that any number or type of imaging devices may be provided within the materials handling facility 220 in accordance with the present disclosure, including but not limited to digital cameras, depth sensors or range cameras, infrared cameras, radiographic cameras or other optical sensors.

The materials handling facility 220 may also include any number of other sensors, components or other features for controlling or aiding in the operation of the materials handling facility 220, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The customer 280 may be any entity or individual that wishes to manually or automatically retrieve, evaluate and/or purchase one or more items maintained in an inventory area of the materials handling facility 220, or to download, purchase, rent, lease, borrow or otherwise obtain items (e.g., goods, products, services or information of any type or form) from the marketplace 210. The customer 280 may utilize one or more computing devices, such as a smartphone 282 or any other like machine that may operate or access one or more software applications, such as a web browser (not shown) or a shopping application 284, and may be connected to or otherwise communicate with the marketplace 210, or the materials handling facility 220 through the network 290, as indicated by line 288, by the transmission and receipt of digital data. For example, the customer 280 may use the smartphone 282 or another like client device to interact with one or more computer devices and/or input/output devices within the materials handling facility 220, and for any purpose. Moreover, the customer 280 may retrieve items from the materials handling facility 220, and also receive deliveries or shipments of one or more items from facilities maintained by or on behalf of the marketplace 210, such as the materials handling facility 220.

Alternatively, or in addition to the customer 280, the materials handling facility 220 may also include one or more human operators (not shown), such as one or more workers, who may be any designated personnel tasked with performing one or more tasks within the materials handling facility 220 in general, or within one or more inventory areas, receiving stations, distribution stations or other locations of the materials handling facility 220 in particular. Such workers may handle or transport items (e.g., any type or form of good, product, media or other tangible consumer article) within the materials handling facility 220, or operate one or more pieces of equipment therein (not shown). The workers may also operate one or more specific computing devices or resources for registering the receipt, retrieval, transportation or storage of items within the materials handling facility 220, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the server 222, with one or more of the imaging devices 225-1, 225-2 . . . 225-n, or with one or more computer devices or resources, such as the server 212 or the smartphone 282, over the network 290, as well as a display (e.g., a touchscreen display) to facilitate the visible presentation to and interaction with a human operator. Such devices may be configured to store a unique identifier associated with a given human operator, and provide the unique identifier to the server 222 or to another computer device or resource in order to identify the human operator. In some implementations, a portable device may also include one or more other features, e.g., audio input/output peripherals or accessories, such as speakers or microphones, as well as video input/output peripherals or accessories, such as cameras, projectors, haptic peripherals, accessories such as keyboards, keypads, touchscreens, joysticks, control buttons, or other components. Such portable devices may operate in conjunction with or may otherwise utilize or communicate with one or more components of the materials handling facility 220.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "materials handling facility," or a "customer" (or "human operator" or "user") or like terms, may be automated steps performed by their respective computer devices or resources, or implemented within software modules (or computer programs) executed by one or more general purpose computers. Those of ordinary skill in the pertinent arts would also recognize that process steps described as being performed by a "marketplace," a "fulfillment center," or a "customer" (or "human operator" or "user") may be typically performed by a human, but could, alternatively, be performed by an automated agent.

The marketplace 210, the materials handling facility 220 and/or the customer 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages. For example, the server 222 may be adapted to transmit information or data in the form of synchronous or asynchronous messages from the materials handling facility 220 to the server 212, the smartphone 282 or any other computer device (e.g., any device having any number of other servers, data stores, processors or the like) in real time or in near-real time, or in one or more offline processes, via the network 290. Those of ordinary skill in the pertinent arts would recognize that the marketplace 210, the materials handling facility 220 or the customer 280 may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the server 212, the server 222, the imaging devices 225-1, 225-2 . . . 225-*n* or the smartphone 282, or any other computers or control systems utilized by the marketplace 210, the materials handling facility 220 or the customer 280 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3:
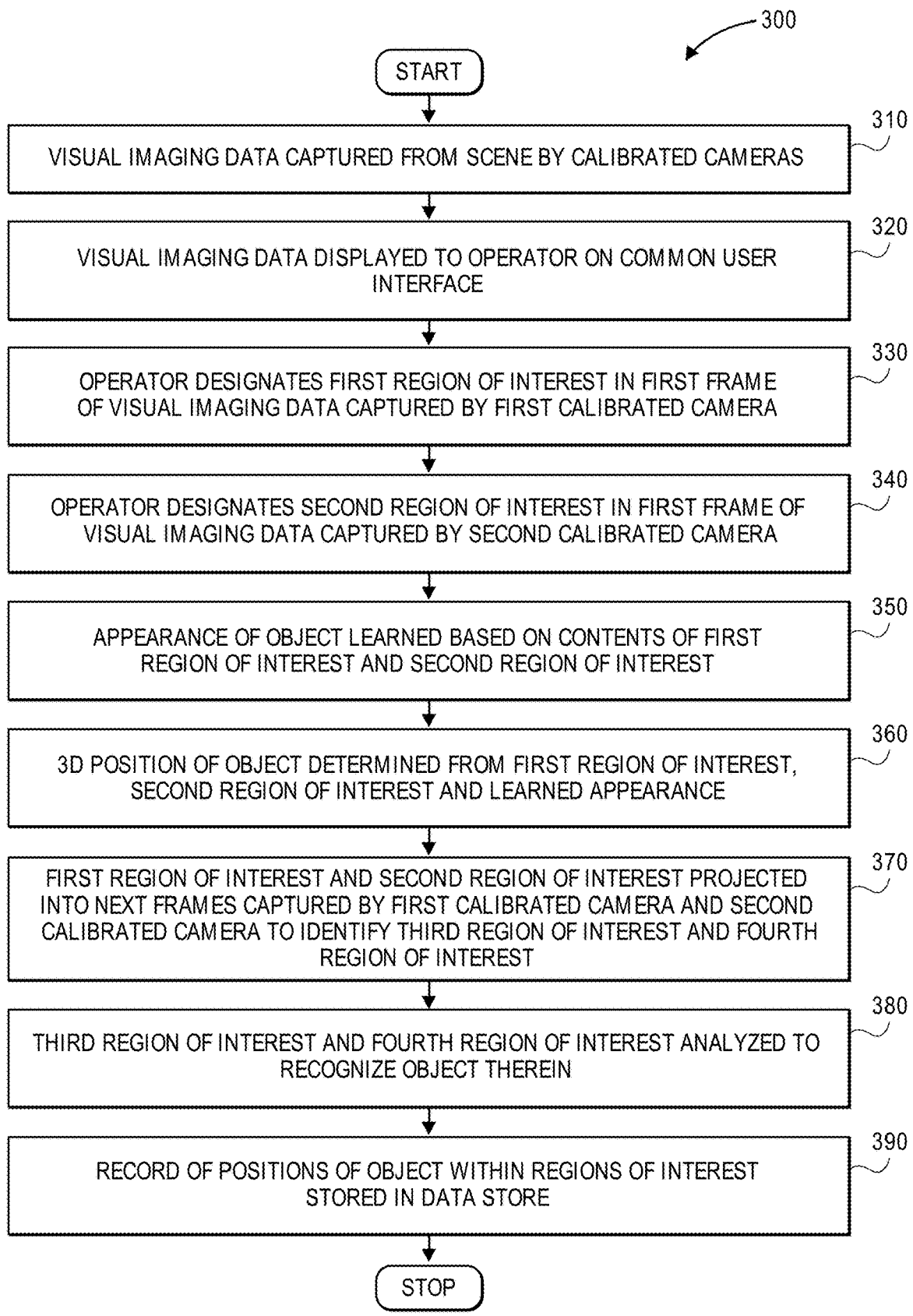
FIG. 3 is a flow chart of one process for annotating multiple video files in accordance with implementations of the present disclosure.

Referring to FIG. 3, a flow chart 300 of one process for annotating multiple video files in accordance with implementations of the present disclosure is shown. At box 310, visual imaging data is captured from a scene by a plurality of calibrated cameras. For example, referring again to FIG. 1A, the imaging devices 125-1, 125-2 are shown as having fields of view that overlap and/or intersect, and are configured to simultaneously capture image frames from the scene. The visual imaging data may be stored in one or more data stores, e.g., in the same physical location as the scene, or in one or more alternate or virtual locations, e.g., in a "cloud"-based environment.

At box 320, at least some of the visual imaging data is displayed to an operator on a common user interface. For example, one or more image frames captured from the scene, from different cameras, may be displayed to the operator on one or more computer displays, such as is shown in FIG. 1B. At box 330, the operator designates a first region of interest in a first frame of the visual imaging data captured by a first calibrated camera. The operator may designate the first region of interest in any manner, including but not limited to by a touchscreen interaction, such as is shown in FIG. 1C or FIG. 1D, or by any other interaction with any type or form of input/output device (e.g., a mouse or keyboard). For example, the operator may execute one or more gestures with respect to a displayed image by way of an input/output device, such as by forming a box or another polygon, a circle, or any other shape, or by defining one or more alphanumeric characters or other symbols thereon. In some implementations, the first frame may be displayed on a touchscreen, and a human operator may execute such gestures by contacting at least a portion of the touchscreen with one or more fingertips, styluses or other objects, and dragging the fingertips, styluses or other objects across the touchscreen in a manner that forms one or more shapes or defines one or more characters or symbols thereon. Data regarding positions or points corresponding to aspects of such gestures may be used to define the first region of interest accordingly. At box 340, the operator designates a second region of interest in a first frame of the visual imaging data captured by the second calibrated camera, e.g., in the same manner that the first region of interest was designated at box 330, or in a different manner.

At box 350, the appearance of the object is learned based on the contents of the first region of interest and the second region of interest. For example, the portions of the respective frames of imaging data designated by the operator in box 330 and box 340 may be analyzed to recognize any edges, contours, outlines, colors, textures, silhouettes, shapes or other characteristics within the first region of interest or the second region of interest. By selecting the regions of interest in frames that were captured from different fields of view, the operator expressly indicates that such regions correspond to a common object. For example, the contents of at least the first region of interest and the second region of interest may be provided to a deep neural network, a convolutional neural network, a support vector machine or another classifier that is trained to recognize and mark transitions (e.g., the edges, contours, outlines, colors, textures, silhouettes, shapes or other characteristics of objects or portions thereof) or other features within image frames as closely as possible, in a manner that minimizes noise and disruptions, and does not create false transitions. Any type of algorithm or technique may be used to evaluate the contents of the first region of interest and the second region of interest, and to recognize one or more objects therein, in accordance with the present disclosure.

At box 360, a position of the object in three-dimensional space is determined from the first region of interest, the second region of interest and the learned appearance of the object. For example, the position of the object may be identified based on any number of pixels within each of the regions, e.g., pixels within boxes or shapes corresponding to the respective regions of interest, a representative pixel of the object, pixels corresponding to an outline of the object, or pixels within such an outline. As is discussed above, data regarding positions of sides, vertices or other boundaries or perimeters of the first region of interest in the first visual image frame (e.g., a plurality of coordinate pairs corresponding to such sides, vertices or boundaries or perimeters) may be transferred into a second visual image frame captured by another calibrated camera, e.g., by triangulation, and a second region of interest may be defined in the second visual image frame thereby. At box 370, the first region of interest and the second region of interest are projected into the next frames captured by the first calibrated camera and the second calibrated camera to identify a third region of interest and a fourth region of interest within such frames. For example, a predicted location of a region of interest corresponding to an object within one image frame captured from a specific field of view may be determined based on a prior location of the region of interest within another image frame previously captured from the same field of view. At box 380, the third region of interest and the fourth region of interest are analyzed to recognize the object that was recognized in the first region of interest and the second region of interest therein. The regions of interest may be analyzed according to any algorithm or technique, including but not limited to, in some implementations, the algorithm or technique by which the appearance of the object was recognized from the first region of interest and the second region of interest at box 350.

At box 390, a record of the positions of the object within each of the regions of interest is stored in at least one data store, and the process ends. For example, such a record may include one or more parameters indicative of positions of image pixels corresponding to the object, or corresponding to one or more boundaries or buffers associated with the regions of interest, or any other information or data regarding a location of the object within visual image frames, as well as labels of the image frames and/or times at which such image frames were captured (e.g., time stamps).

As is discussed above, data regarding annotations and/or regions of interest designated by an operator in a visual image frame captured by a calibrated camera may be replicated in any number of other image frames captured by other calibrated cameras at the same time. Referring to FIGS. 4A through 4F, views of aspects of one system 400 for annotating multiple video files in accordance with implementations of the present disclosure are shown. Except where otherwise noted, reference numerals preceded by the number "4" shown in FIGS. 4A through 4F indicate components or features that are similar to components or features having reference numerals preceded by the number "2" shown in FIG. 2 or by the number "1" shown in FIGS. 1A through 1I.

Figure 4A:
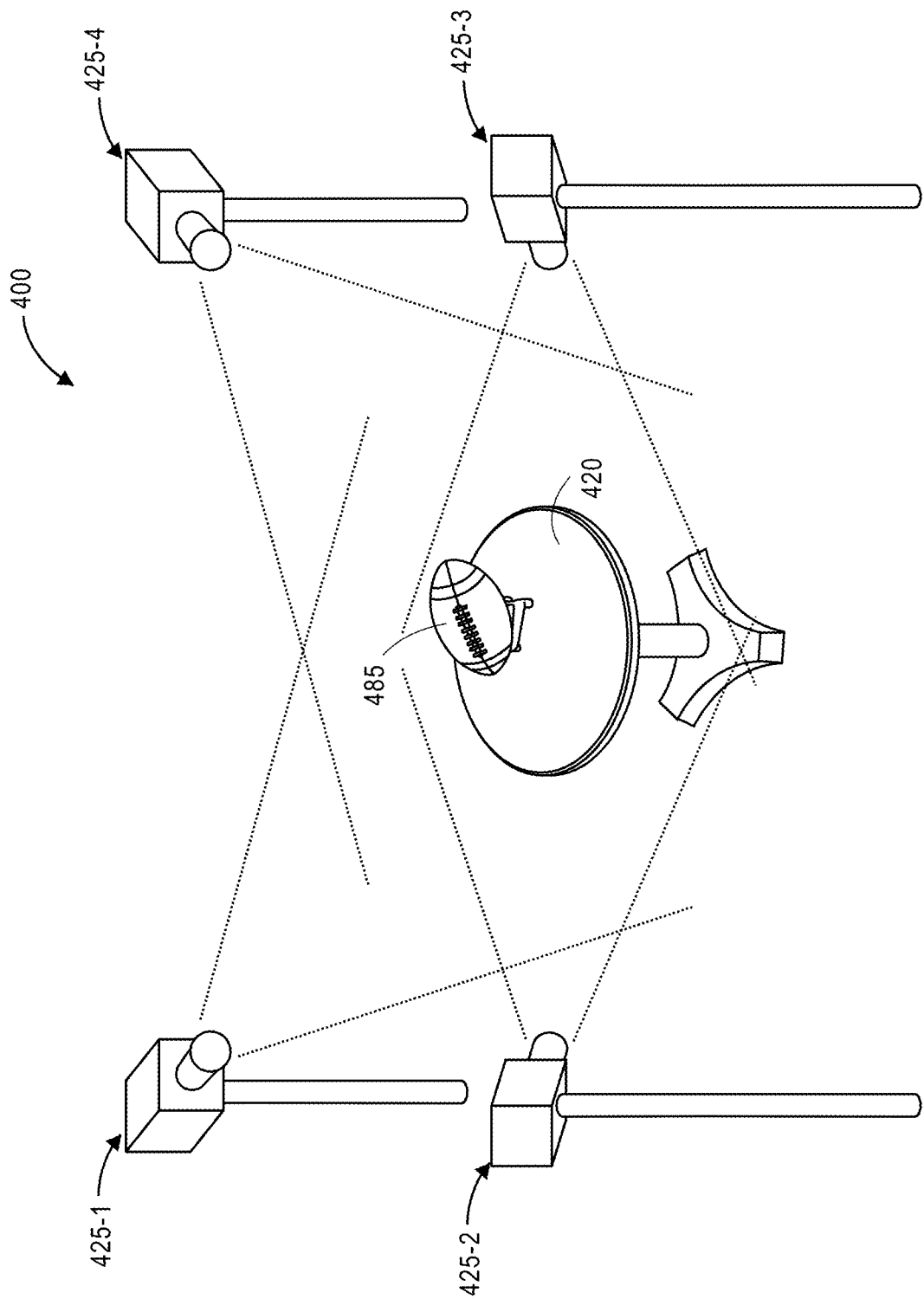
FIG. 4A through 4F are views of aspects of one system for annotating multiple video files in accordance with implementations of the present disclosure.
Figure 4B:
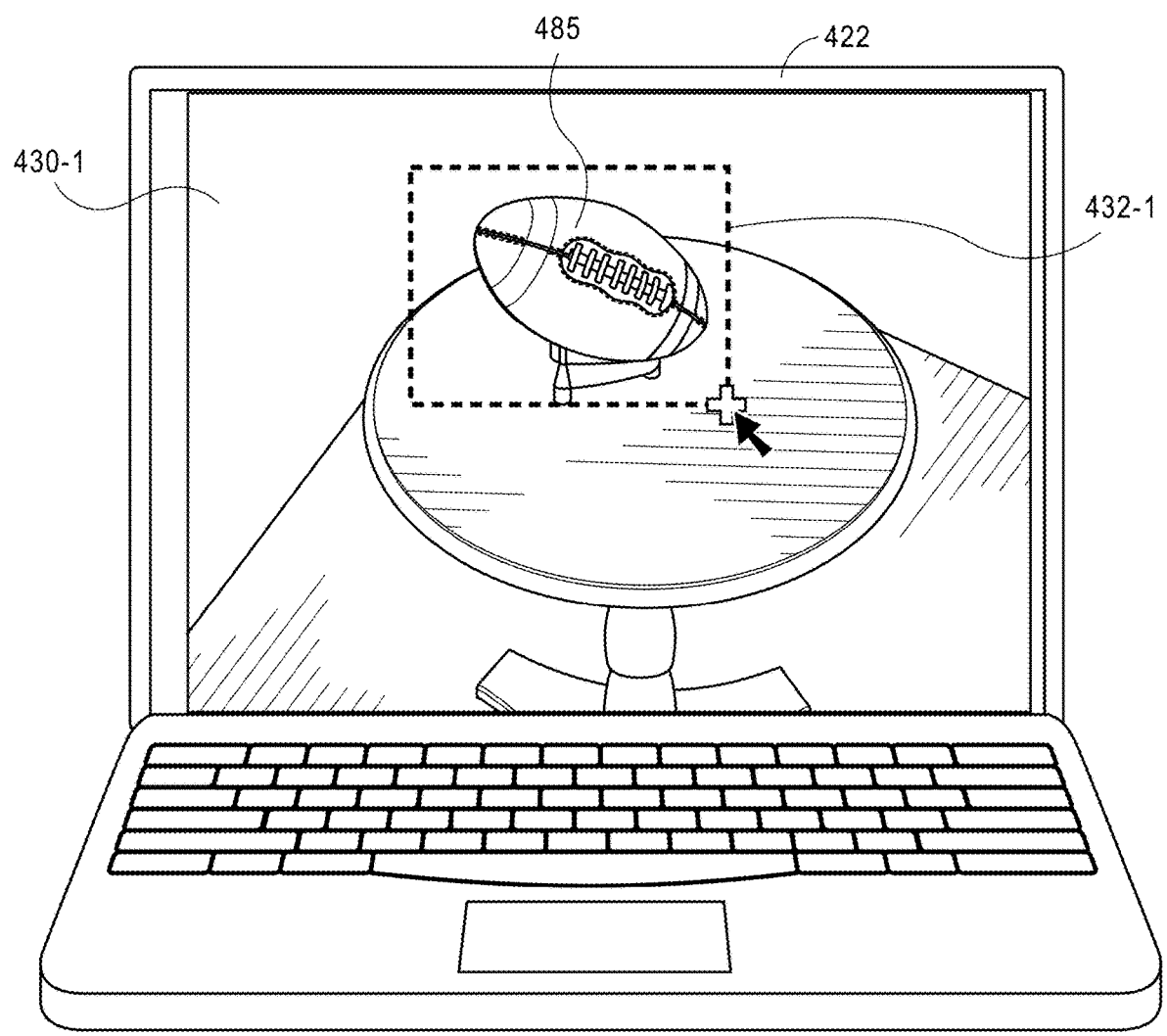
Figure 4C:
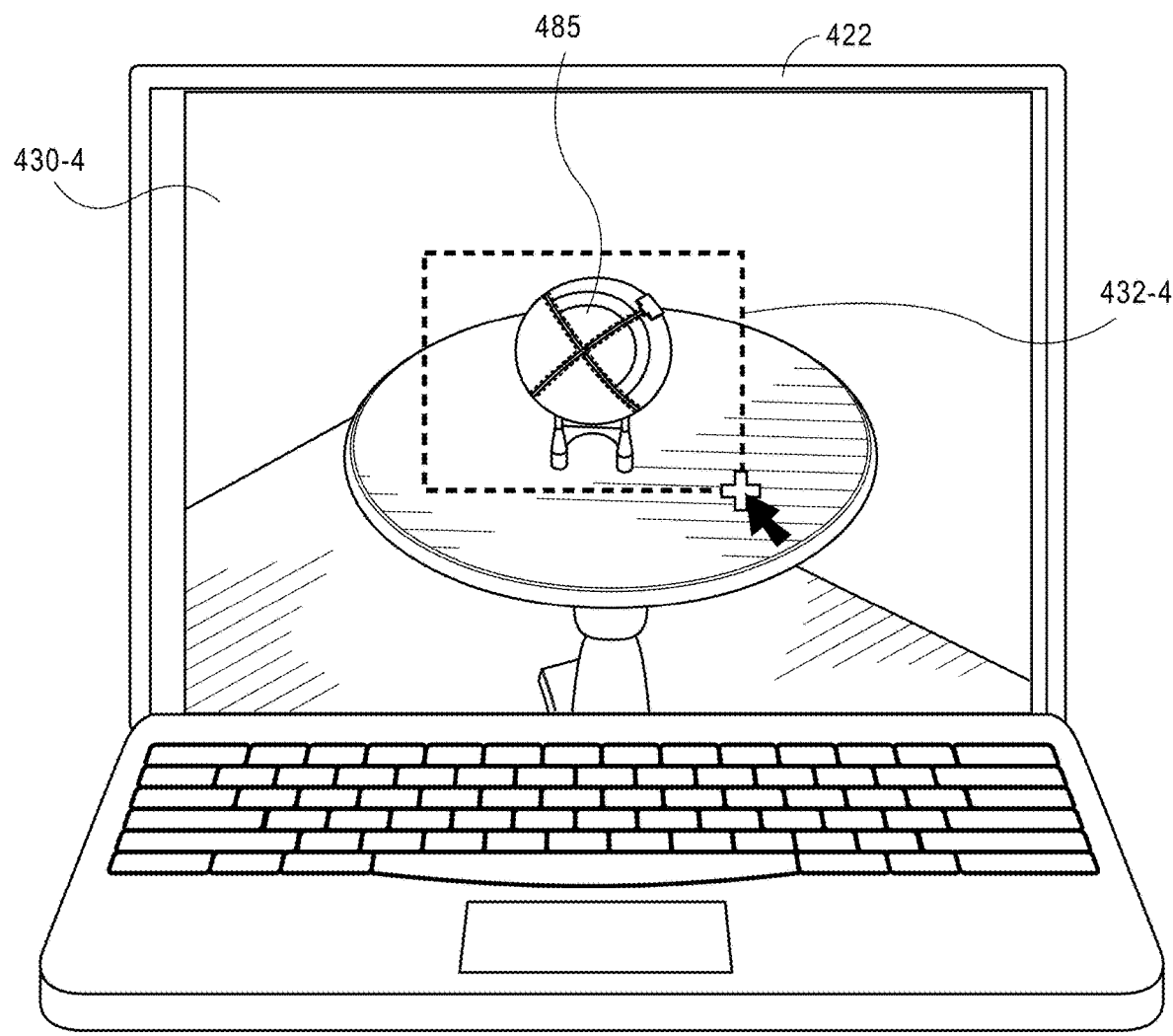

As is shown in FIG. 4A, the system 400 includes a plurality of imaging devices 425-1, 425-2, 425-3, 425-4 that are aligned to capture imaging data regarding an object 485 placed on a table 420 or another storage surface. The imaging devices 425-1, 425-2, 425-3, 425-4 are calibrated, such that mappings between coordinates of imaging data captured by such devices and directions relative to their respective image sensors are known. As is shown in FIG. 4B, an image frame 430-1 captured by the imaging device 425-1 may be displayed by a computer device 422. An operator (not shown) may define an annotation 432-1 by designating a region of interest in the image frame 430-1, e.g., a portion of the image frame 430-1 depicting the object 485, using a mouse, a pointer, a touchscreen or another input/output device. Similarly, as is shown in FIG. 4C, an image frame 430-4 captured by the imaging device 425-4 may be displayed by the computer device 422, and the operator may define another annotation 432-4 by designating a region of interest in the image frame 430-4.

Figure 4D:
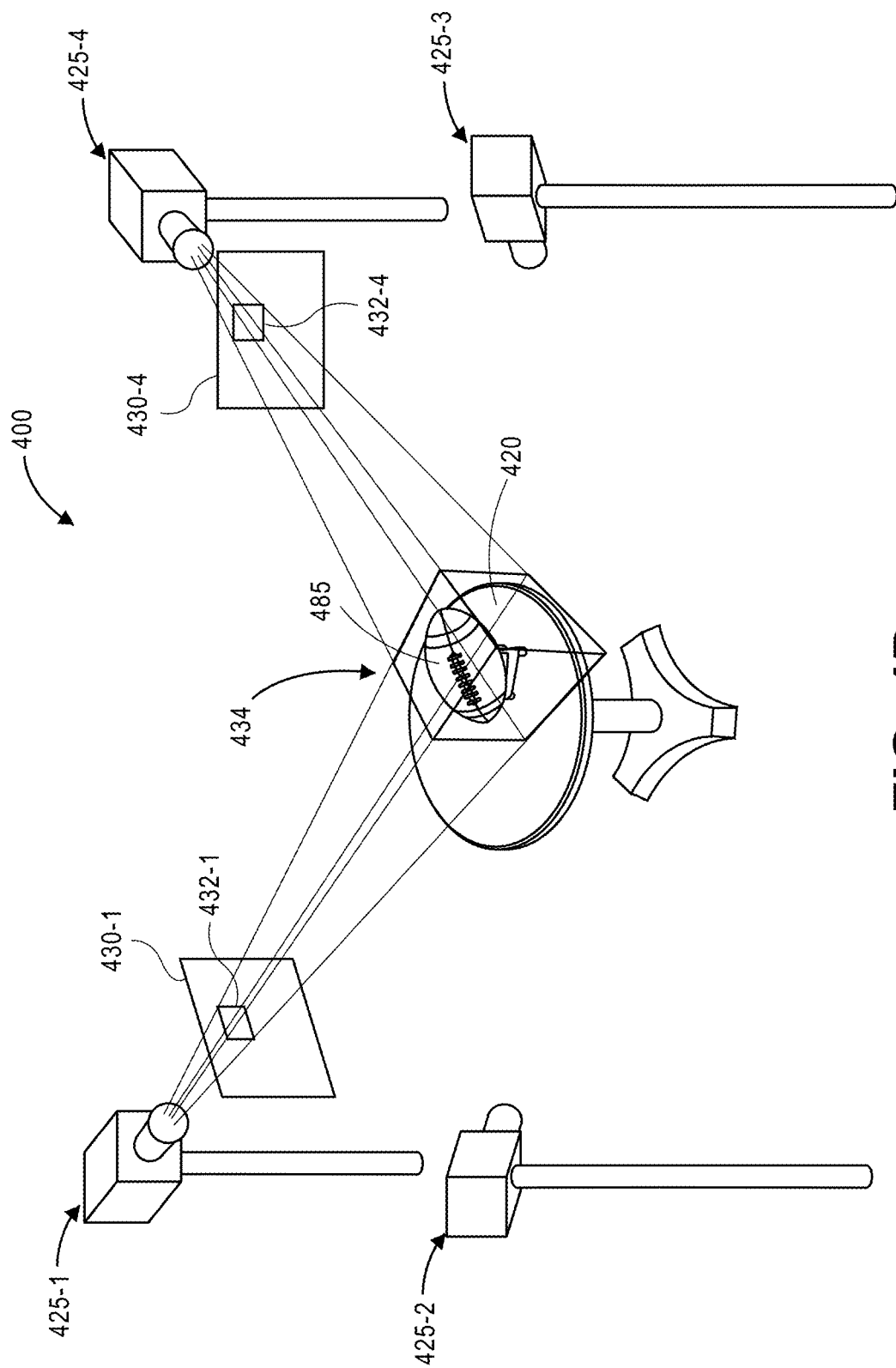

In some implementations, data regarding an annotation entered by an operator into an image frame (e.g., a region of interest designated by the operator in the image frame) that has been captured from a scene by a calibrated camera at a given time may be transposed into other image frames captured from the scene by other calibrated cameras at the same time. For example, as is shown in FIG. 4D, sets of rays originating at a position of an image sensor of the imaging device 425-1 may be virtually extended through vertices or other points (e.g., points corresponding to a boundary or perimeter) of the annotation 432-1 within a plane of the image frame 430-1 captured by the imaging device 425-1. Similarly, sets of rays originating at a position of an image sensor of the imaging device 425-4 may be virtually extended through vertices or other points (e.g., points corresponding to a boundary or perimeter) of the annotation 432-4 within a plane of the image frame 430-4 captured by the imaging device 425-4. As is shown in FIG. 4D, the respective sets of rays, and points in space at which the rays virtually intersect, define a region 434 (e.g., a virtual construct corresponding to the annotations 432-1, 432-4) that surrounds a location of the object 485 in three-dimensional space.

Figure 4E:
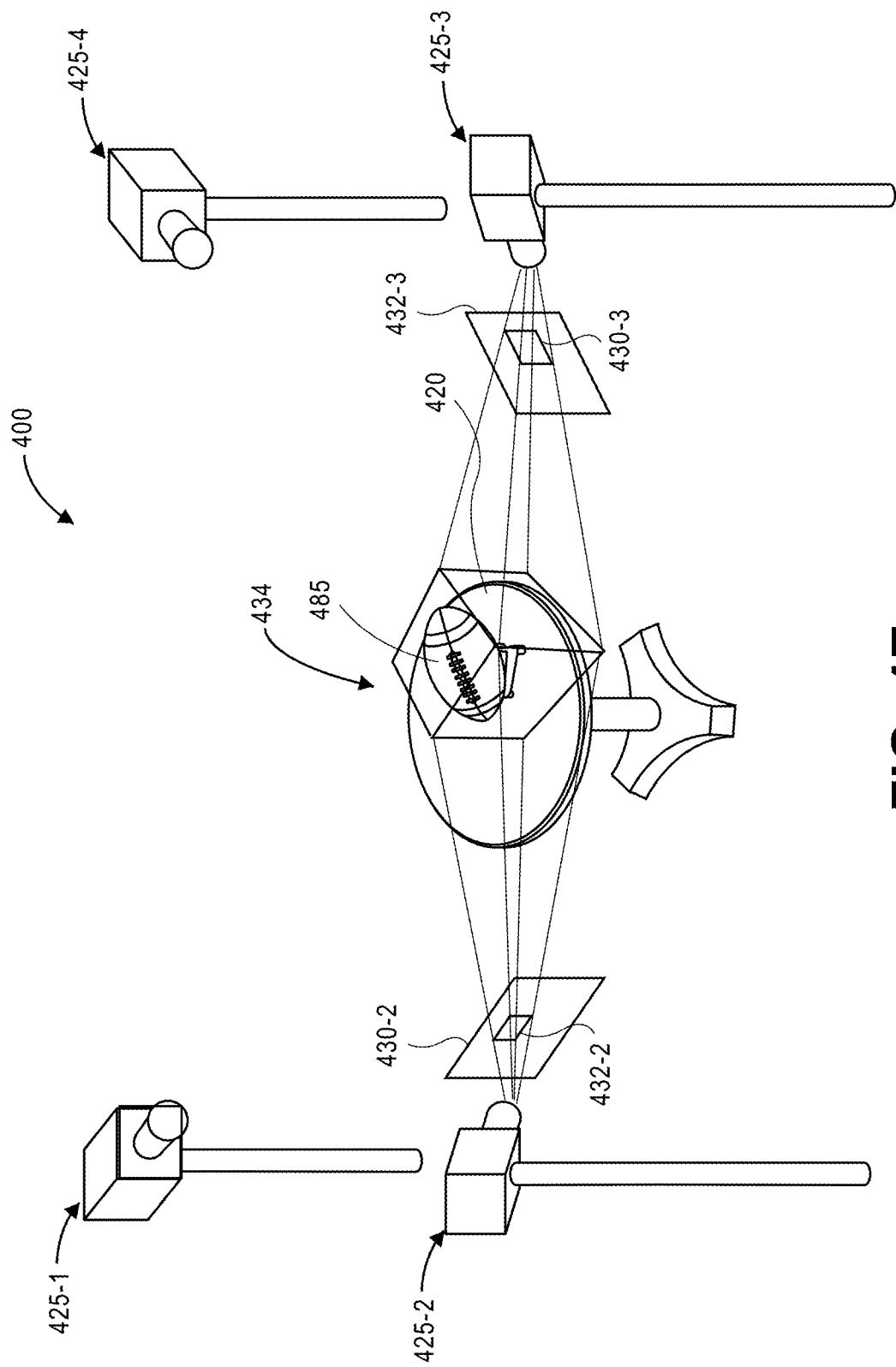

Once the region 434 has been defined based on the annotations 432-1, 432-4, data regarding the region 434 may be transposed into image frames 430-2, 430-3 captured by the imaging devices 425-2, 425-3. For example, as is shown in FIG. 4E, a set of rays virtually extending from a position of an image sensor of the imaging device 425-2 to vertices or other points (e.g., points corresponding to a boundary or perimeter) of the region 434 may define an annotation 432-2 within a plane of the image frame 430-2. Similarly, a set of rays virtually extending from a position of an image sensor of the imaging device 425-3 to vertices or other points (e.g., points corresponding to a boundary or perimeter) of the region 434 may define an annotation 432-3 within a plane of the image frame 430-3.

Figure 4F:
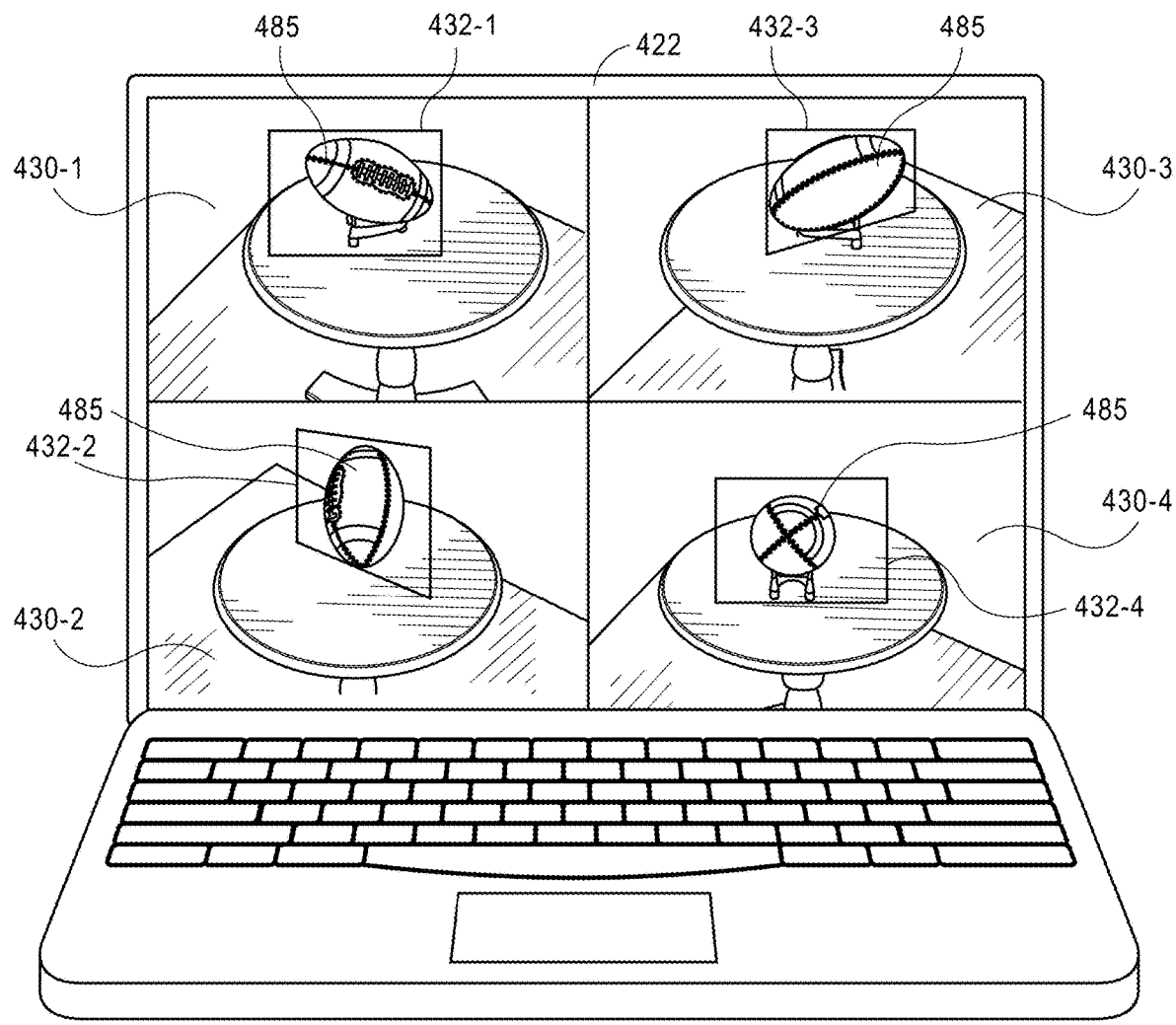

As is shown in FIG. 4F, the image frames 430-1, 430-2, 430-3, 430-4 are displayed by the computer device 422, e.g., on a common user interface. The annotation 432-1 defined by the operator, as is shown in FIG. 4B, is shown as superimposed upon the image frame 430-1, and the annotation 432-4 defined by the operator, as is shown in FIG. 4C, is shown as superimposed upon the image frame 430-4. Additionally, each of the annotations 432-2, 432-3 that were generated based on the region 434 defined by data corresponding to the annotations 432-1, 432-4 is also shown as superimposed upon the image frames 430-2, 430-3, respectively. Subsequently, each of the annotations 432-1, 432-2, 432-3, 432-4, or the representations of the object 485 therein, may be tracked within image frames that are subsequently captured using the imaging devices 425-1, 425-2, 425-3, 425-4.

Figure 5:
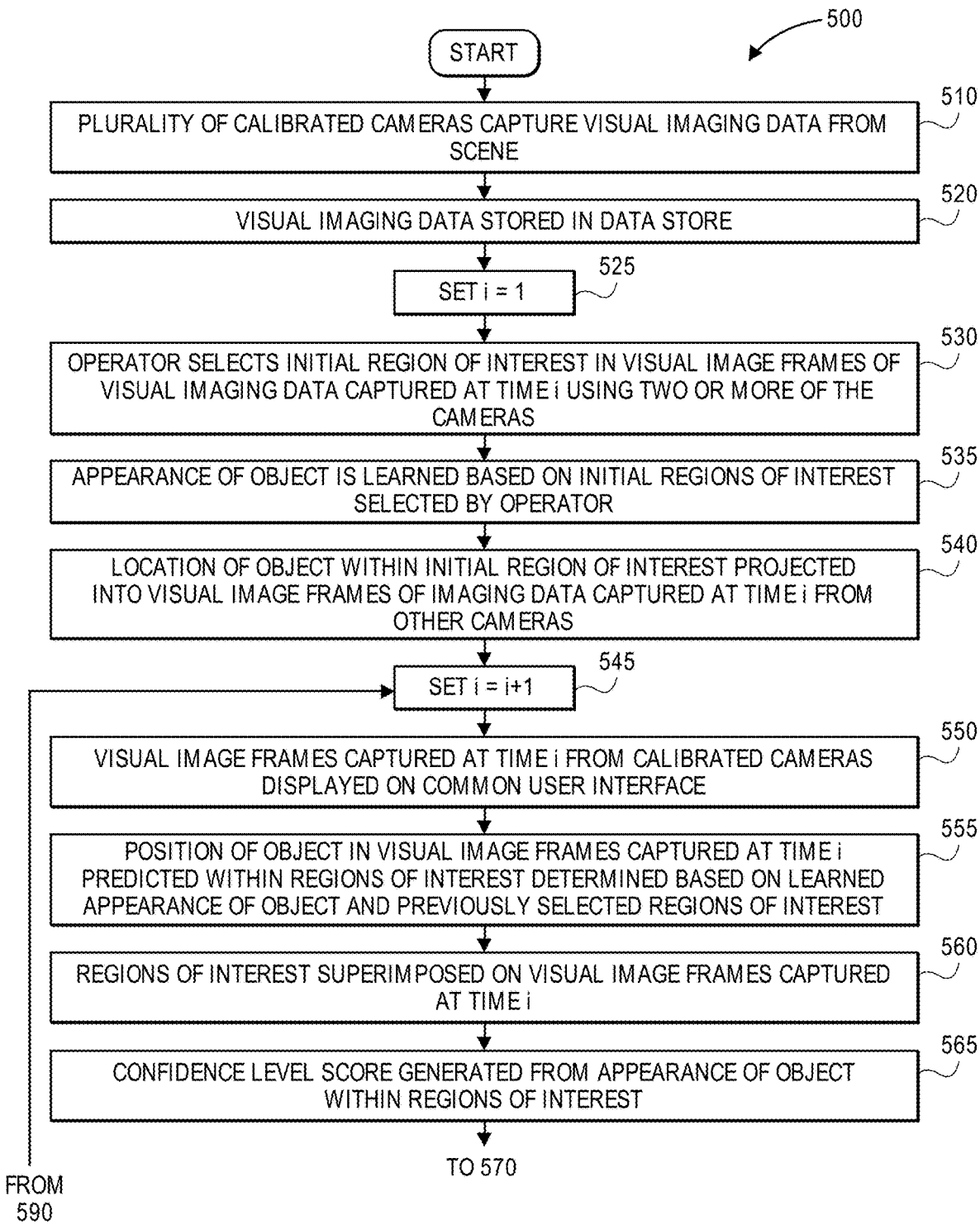
FIG. 5 is a flow chart of one process for annotating multiple video files in accordance with implementations of the present disclosure.
Figure 5:
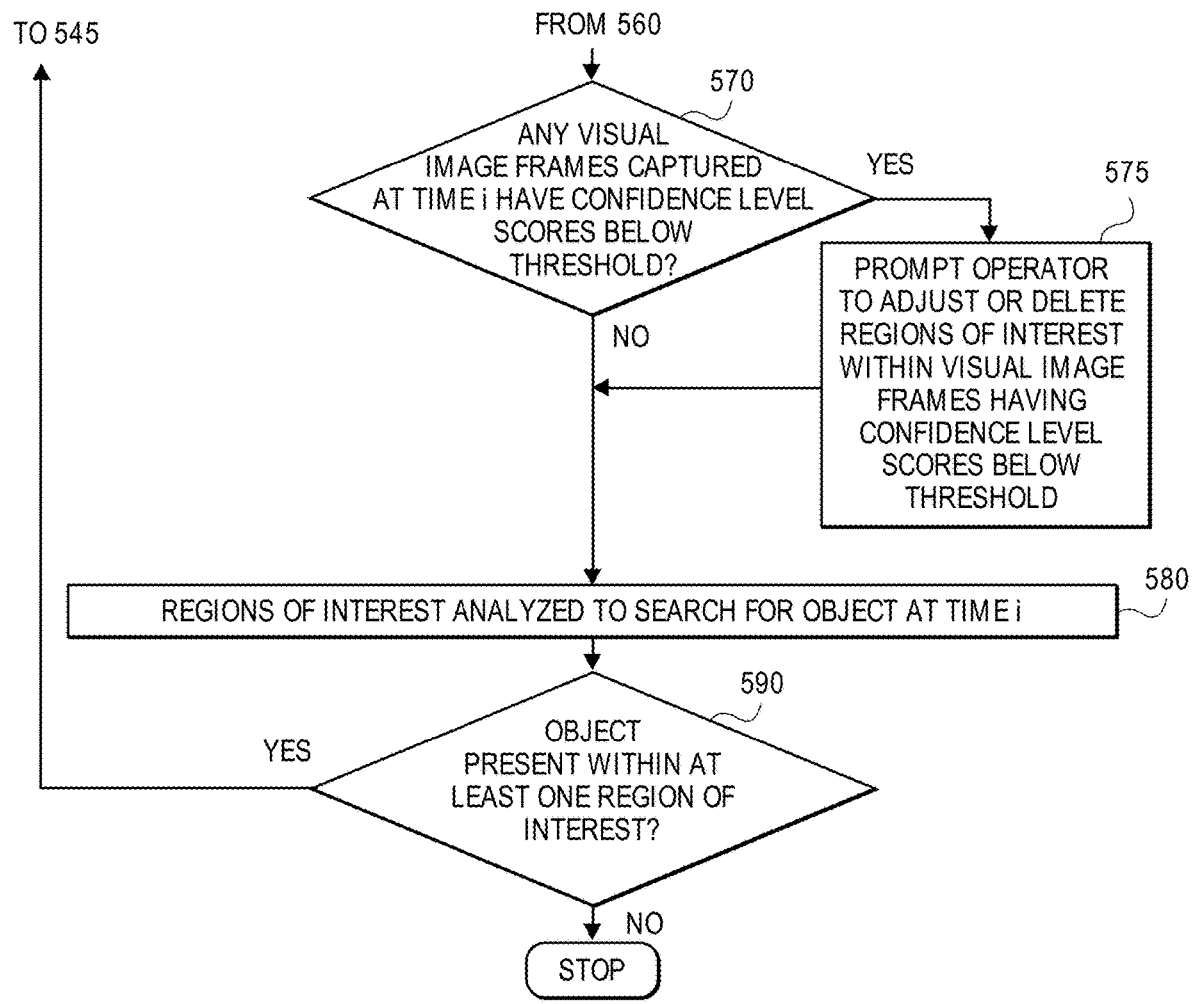

Data regarding annotations of regions of interest (or objects of interest) in a single image frame, or in two or more image frames, may be transposed to any number of other image frames captured by any number of other calibrated imaging devices, and such regions or objects may be tracked within subsequently captured image frames as long as the regions and/or objects remain visible within the fields of view of such imaging devices. Referring to FIG. 5, a flow chart 500 of one process for annotating multiple video files in accordance with implementations of the present disclosure is shown. At box 510, a plurality of calibrated cameras capture visual imaging data from a scene. The cameras may be aligned at different angles with respect to the scene, and may therefore capture the visual imaging data from different perspectives. At box 520, the visual imaging data captured by the calibrated cameras at box 510 is stored in at least one data store.

At box 525, a value of a step variable i is set to 1. At box 530, an operator selects an initial region of interest (e.g., an initial annotation) in visual image frames of visual imaging data captured at time i using two or more of the calibrated cameras. The regions of interest may be selected in each of the visual image frames by the operator in any manner, e.g., by one or more interactions with a touchscreen, a keyboard or another input/output device. Moreover, the initial regions of interest may have any size and be of any shape, including but not limited to a rectangle, a triangle or any other polygon, as well as a circle or other shape. At box 535, an appearance of the object is learned based on the initial regions of interest selected by the operator. The appearance of the object may be learned according to one or more algorithms, techniques or classifiers, e.g., by a tracker trained to recognize a specific type of object therein (e.g., a KCF tracker), or any other algorithm, technique or classifier, based on one or more edges, contours, outlines, colors, textures, silhouettes, shapes or other characteristics that are depicted within the region of interest.

At box 540, a location of the object within the initial regions of interest is projected into the visual image frames of the imaging data captured at time i from other cameras. For example, a plurality of rays corresponding to the object within the initial region of interest may be virtually extended from a position of an image sensor of the calibrated camera that captured the visual image frame to contact with rays extended from positions of the image sensors of the other calibrated cameras. Points within planes of the image frames that intersect with such rays may define a portion of the object within the respective image frames.

At box 545, the value of the step variable i is incremented by 1, or set to equal i+1. At box 550, visual image frames captured by the calibrated cameras at time i are displayed on a common user interface, e.g., on one or more computer displays. For example, where the plurality of calibrated cameras consists of two cameras, or where only two of the plurality of calibrated cameras are considered, two image frames captured at a common time may be displayed on a user interface, such as is shown in FIG. 1B. Where more than two cameras may include the object within their respective fields of view, any number of other image frames may be shown.

At box 555, a position of the object within visual image frames captured at time i is predicted within the regions of interest determined based on the learned appearance of the object and the previously selected regions of interest. In some implementations, the regions of interest may be automatically defined in a subsequently captured frame based on a triangulation or other replication of the initial region of interest, or of one or more other regions of interest. For example, in some implementations, one or more hypothetical positions of the regions of interest may be predicted based on regions of interest previously identified in visual images using a tracking algorithm, e.g., an OpenCV tracker or a KCF tracker, or any other algorithm or technique. The regions of interest may have any size and be of any shape, including but not limited to a rectangle, a triangle or any other polygon, as well as a circle or other shape. At box 560, the regions of interest are superimposed on the visual image frames captured at time i.

At box 565, a confidence level score is generated based on the position of the object within the regions of interest formed at box 555, and superimposed upon the visual image frames at box 560. The score may represent confidence that the superimposed region of interest includes the object of interest, and may be calculated based on the appearance of the object of interest within the region of interest. For example, the confidence level score may be based on a degree of similarity between pixels within a region of interest defined in a visual image frame captured at time i, and pixels within a region of interest defined in a previously captured visual image frame, e.g., an image frame captured at time (i−1). Alternatively, the confidence level score may be calculated based on the three-dimensional geometries defined by the respective regions of interest, e.g., within pyramidal or frustopyramidal areas in three-dimensional space that are defined by such regions of interest. Any method or technique for determining a level of confidence in a position of an object within a region of interest may be utilized in accordance with the present disclosure.

At box 570, whether any of the visual image frames captured at time i have confidence scores that are below a predetermined threshold is determined. If any of the image frames have confidence scores below the predetermined threshold, then the process advances to box 575, where the operator is prompted to adjust or delete the regions of interest within such visual image frames. If none of the image frames have confidence scores below the predetermined threshold, or after the operator has adjusted or deleted such regions of interest (or declined to do so), following the prompt at box 575, the process advances to box 580, where the regions of interest are analyzed to search for the object at time i. At box 590, if the object is determined to be present within at least one of the regions of interest, the process returns to box 545, where a value of the step variable is incremented by 1, or set to equal i+1. If the object is not determined to be present within any of the regions of interest, then the process ends.

Figure 6A:
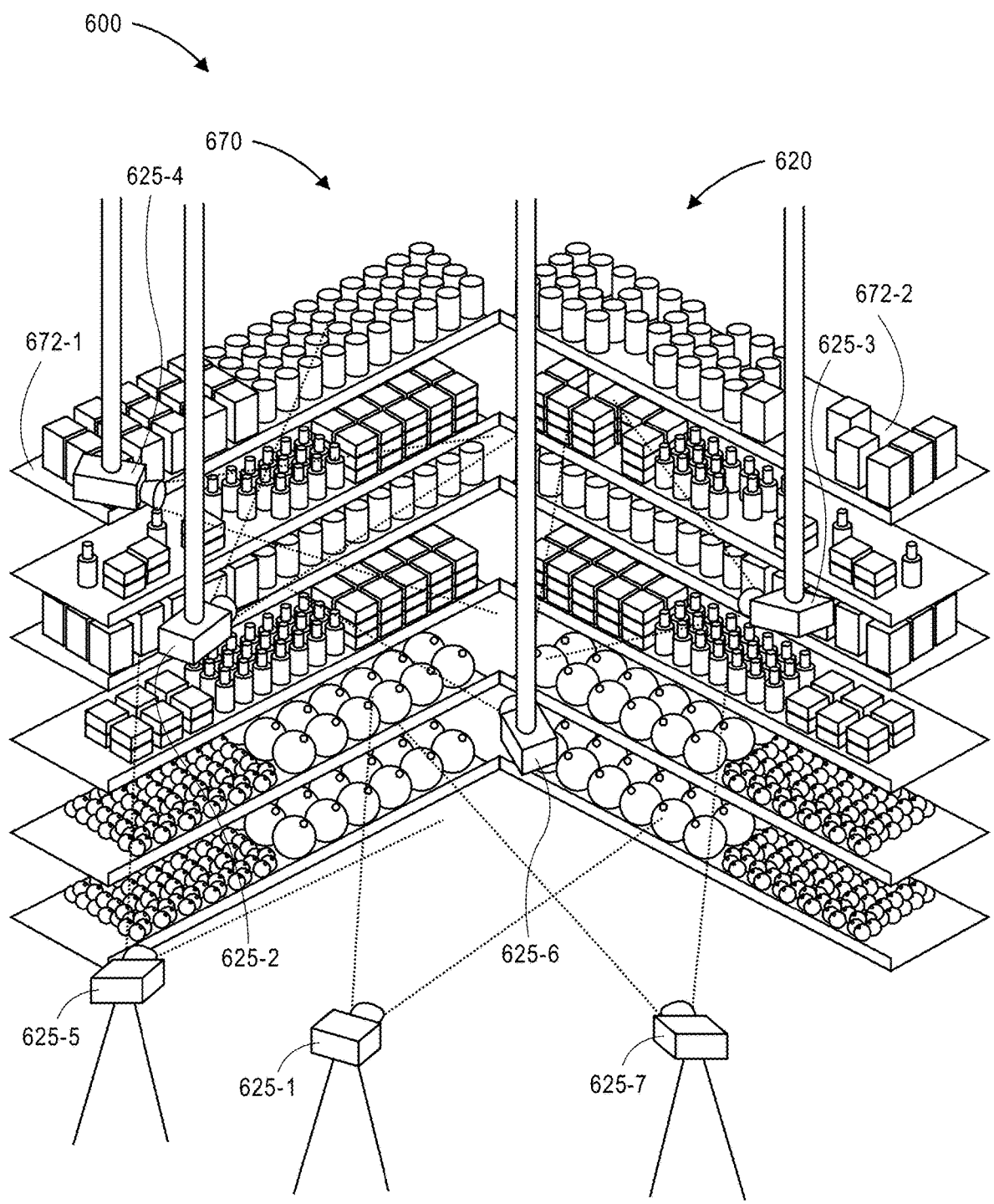
FIGS. 6A through 6C are views of data captured or generated by a system for annotating multiple video files in accordance with implementations of the present disclosure.
Figure 6B:
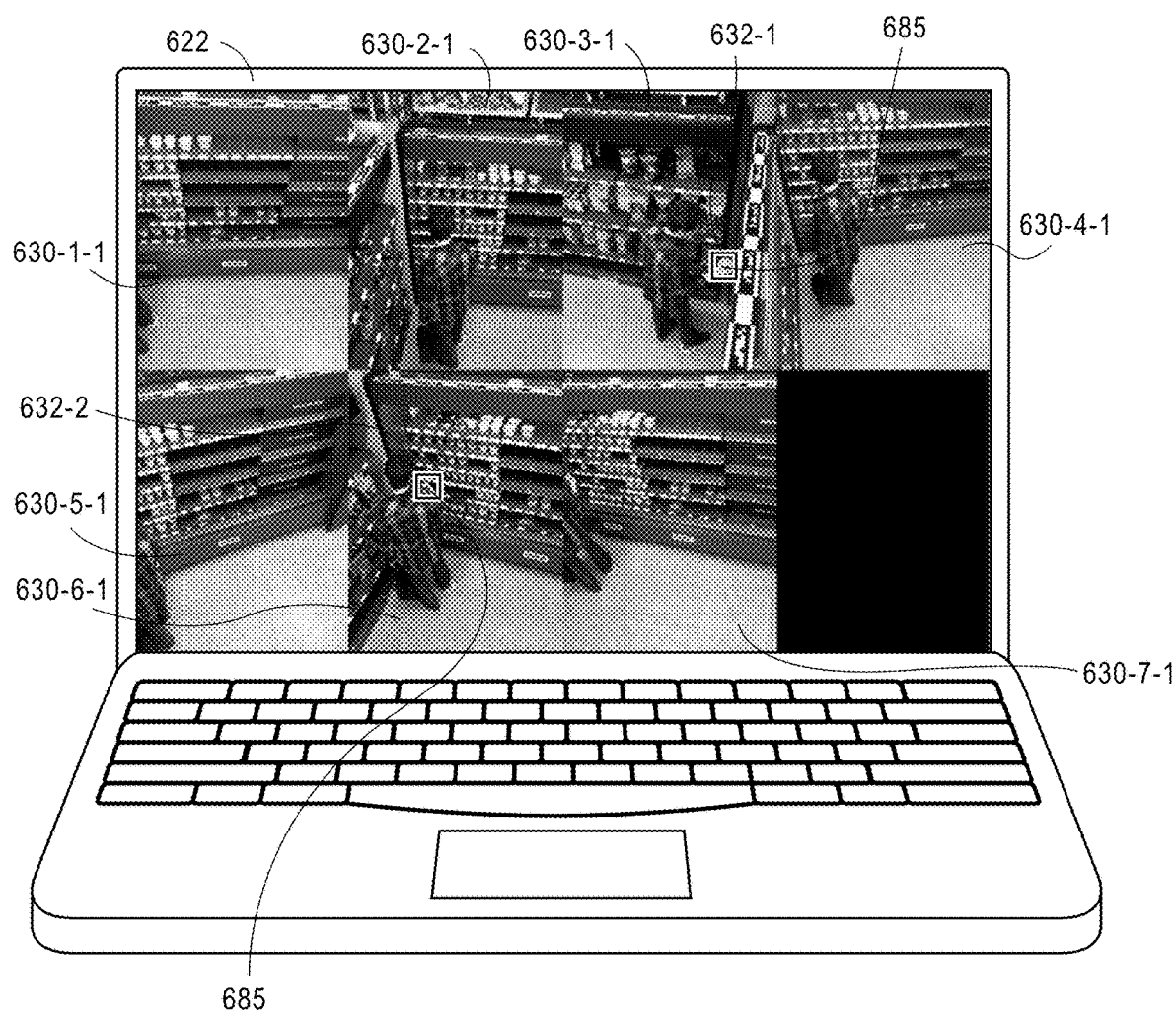
Figure 6C:
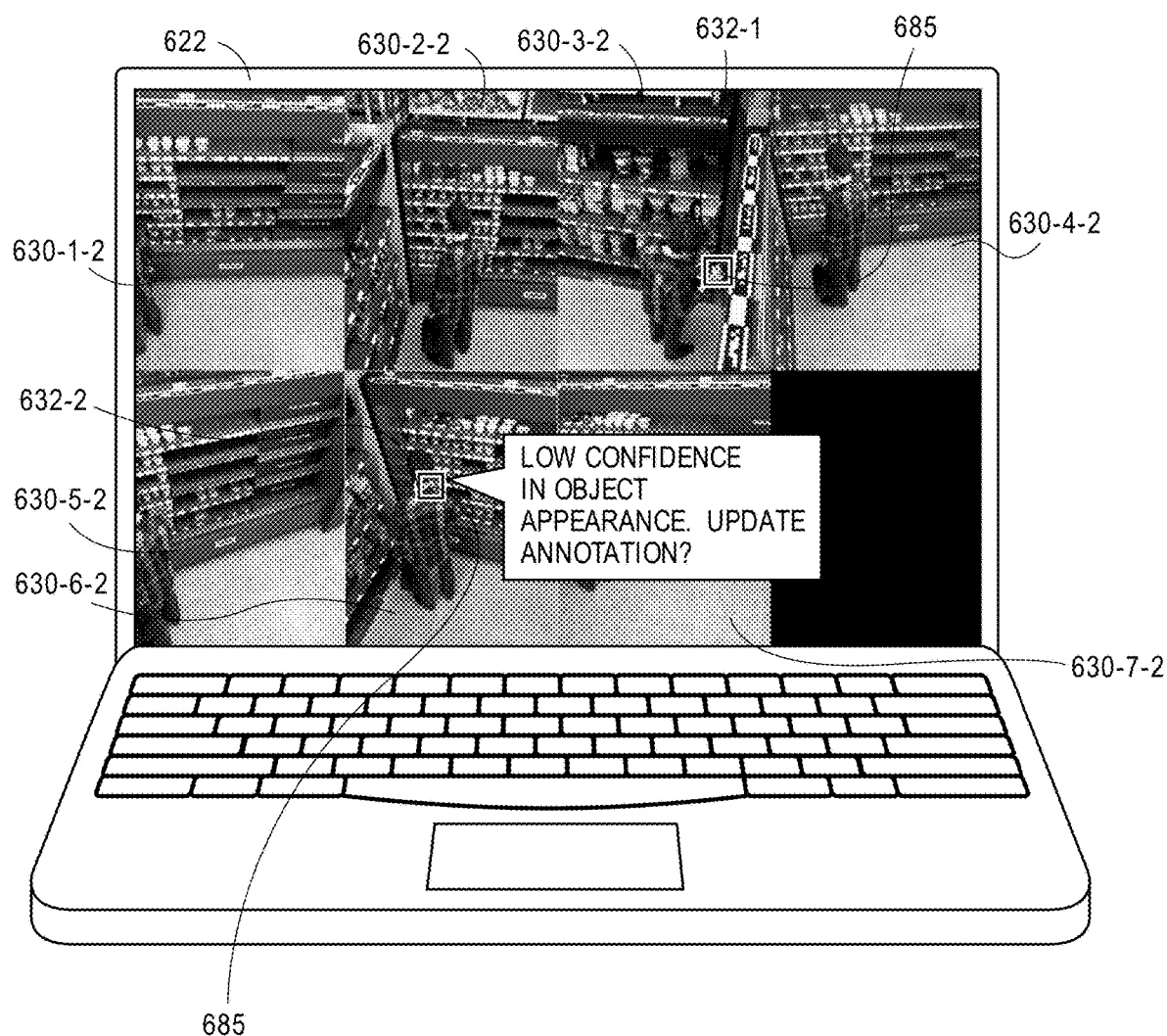

Referring to FIGS. 6A through 6C, views of aspects of one system 600 for annotating multiple video files in accordance with implementations of the present disclosure are shown. Except where otherwise noted, reference numerals preceded by the number "6" shown in FIGS. 6A through 6C indicate components or features that are similar to components or features having reference numerals preceded by the number "4" shown in FIGS. 4A through 4F, by the number "2" shown in FIG. 2 or by the number "1" shown in FIGS. 1A through 1I.

As is shown in FIG. 6A, the system 600 includes a materials handling facility 620 having a plurality of calibrated imaging devices 625-1, 625-2, 625-3, 625-4, 625-5, 625-6, 625-7 that are mounted and aligned to include portions of a shelving unit 670, which includes a pair of sets 672-1, 672-2 of shelves, within their respective fields of view. The imaging devices 625-1, 625-5, 625-7 are aligned to capture imaging data regarding interactions with the shelving unit 670 from frontal positions with respect to the sets 672-1, 672-2 of shelves. The imaging devices 625-2, 625-3, 625-4 are aligned to capture imaging data regarding interactions with the shelving unit 670 from elevated positions above the materials handling facility 620.

As is shown in FIG. 6B, a plurality of image frames 630-1-1, 630-2-1, 630-3-1, 630-4-1, 630-5-1, 630-6-1, 630-7-1 captured at time $t_1$ by the imaging devices 625-1, 625-2, 625-3, 625-4, 625-5, 625-6, 625-7, respectively, are shown. An annotation 632-1 of an object 685 (e.g., a right hand of a user grasping an object on one of the shelves of the shelving unit 672-1) is made in the image frame 630-3-1 by an operator (not shown). An annotation 632-2 corresponding to the annotation 632-1 is made in the image frame 630-6-1. Because the object is not visible within the image frames 630-1-1, 630-5-1, and is obscured in the image frames 630-2-1, 630-4-1, 630-7-1, no annotations are automatically replicated into such image frames.

As is shown in FIG. 6C, a plurality of image frames 630-1-2, 630-2-2, 630-3-2, 630-4-2, 630-5-2, 630-6-2, 630-7-2 captured at time $t_2$ by the imaging devices 625-1, 625-2, 625-3, 625-4, 625-5, 625-6, 625-7, respectively, are shown. Although the annotation 632-1 of the object remains visible in the image frame 630-3-2, the annotation 632-2 of the object is obscured by the user in the image frame 630-6-2 at time $t_2$. Therefore, the user may be prompted to update, delete or relocate the annotation 632-2, such as is shown in FIG. 6C. In some implementations, the annotation 632-2 may be automatically deleted.

Although some of the implementations disclosed herein reference the annotation of video files captured in a commercial setting, e.g., within a materials handling facility such as a fulfillment center, the systems and methods of the present disclosure are likewise not so limited. Rather, the systems and methods disclosed herein may be utilized to annotate any video files captured by any number of imaging devices for any purpose, or to utilize the annotations of such video files in any application.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIG. 3 or 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
   a first digital camera including at least a portion of a scene within a first field of view, wherein the portion of the scene includes at least one object;
   a second digital camera including at least the portion of the scene within a second field of view, wherein the first digital camera and the second digital camera are calibrated with respect to one another; and a computer system in communication with the first digital camera and the second digital camera, wherein the first field of view and the second field of view overlap at least in part, and wherein the computer system comprises a computer display, at least one data store and at least one computer processor configured to at least:

identify a first video file captured by the first digital camera, wherein the first video file comprises a first plurality of images captured over a period of time;

identify a second video file captured by the second digital camera, wherein the second video file comprises a second plurality of images captured over at least a portion of the period of time;

cause a display of a first image on a user interface, wherein the first image is one of the first plurality of images captured at a first time within the period of time;

receive a first selection of a first portion of the first image from an operator, wherein the first selection of the portion of the first image comprises a first interaction with the user interface or a portion of the computer display on which the user interface is displayed;

define a first annotation of the at least one object within the first image based at least in part on the first portion of the first image;

identify a second portion of a second image based at least in part on the first annotation, wherein the second portion of the second image corresponds to the first portion of the first image, and wherein the second image is one of the second plurality of images captured at approximately the first time; and define a second annotation of the at least one object within the second image based at least in part on the second portion of the second image.

2. The system of claim 1, wherein the first interaction defines a box having the first portion of the first image therein, and wherein the at least one computer processor is further configured to at least:

define a bounding region based at least in part on:

a first ray extending from a position of a first image sensor of the first digital camera in three-dimensional space at approximately the first time through a location corresponding to a first corner of the box within an image plane of the first digital camera at approximately the first time;

a second ray from the position of the first image sensor of the first digital camera in three-dimensional space at approximately the first time through a location corresponding to a second corner of the box within the image plane of the first digital camera at approximately the first time;

a third ray from the position of the first image sensor of the first digital camera in three-dimensional space at approximately the first time through a location corresponding to a third corner of the box within the image plane of the first digital camera at approximately the first time; and a fourth ray from the position of the first image sensor of the first digital camera in three-dimensional space at approximately the first time through a location corresponding to a fourth corner of the box within the image plane of the first digital camera at approximately the first time; and project the bounding region into an image plane of the second digital camera at approximately the first time, wherein the second portion of the second image is identified based at least in part on the bounding region projected into the image plane of the second digital camera at approximately the first time.

3. A computer-implemented method comprising:

receiving a designation of a first portion of a first image captured by a first imaging device at a first time, wherein the first imaging device has a first field of view;

defining a first annotation of the first image based at least in part on the designation of the first portion of the first image;

identifying a second portion of a second image captured by a second imaging device at approximately the first time, wherein the second imaging device has a second field of view overlapping the first field of view at least in part, and wherein the first portion of the first image corresponds to the second portion of the second image;

generating a second annotation of the second image based at least in part on the second portion of the second image; and storing at least one of:

the first annotation in association with the first image in at least one data store; or the second annotation in association with the second image in the at least one data store.

4. The computer-implemented method of claim 3, wherein receiving the designation of the first portion of the first image comprises:

causing a display of at least the first image in a user interface on at least one computer display of a computer device; and receiving the designation of the first portion of the first image via the user interface or the at least one computer display.

5. The computer-implemented method of claim 3, wherein the designation of the first portion of the first image via the user interface is a gesture with at least one of the user interface or a portion of the at least one computer display by a human operator, and wherein the gesture identifies a set of pixels within the first portion of the first image.

6. The computer-implemented method of claim 3, wherein the annotation is at least one of:

a shape identifying the set of pixels; or a layer comprising one or more of an alphanumeric character, a hyperlink or a marking corresponding to the set of pixels.

7. The computer-implemented method of claim 3, wherein identifying the second portion of the second image based at least in part on the first annotation comprises:

defining a bounding region in three-dimensional space based at least in part on the first annotation; and projecting the bounding region into the second image;

wherein the second portion of the second image is within the bounding region projected into the second image.

8. The computer-implemented method of claim 7, wherein defining the bounding region further comprises:

establishing a first boundary of the bounding region based at least in part on a first ray extending from a position of a first image sensor of the first imaging device at the first time through a first portion of an image plane of the first imaging device corresponding to the first annotation; and establishing a second boundary of the bounding region based at least in part on a second ray extending from the position of the first image sensor of the first imaging device at the first time through a second portion of the image plane of the first imaging device corresponding to the first annotation, wherein the bounding region is defined at least in part by the first boundary and the second boundary.

9. The computer-implemented method of claim 8, wherein identifying the second portion of the second image based at least in part on the first annotation further comprises:

determining a third ray between a position of a second imaging sensor of the second imaging device and at least a first portion of the first boundary in an image plane of the second image; and determining a fourth ray between the position of the second imaging sensor and at least a second portion of the second boundary in the image plane of the second image, wherein the second annotation is generated based at least in part on an intersection of the first ray and the third ray, and an intersection of the second ray and the fourth ray.

10. The computer-implemented method of claim 3, further comprising:

recognizing at least a first set of pixels corresponding to a first portion of an object within the first portion of the first image;

recognizing at least a second set of pixels corresponding to a second portion of the object within the second portion of the second image; and determining a first position of the object in three-dimensional space based at least in part on the first set of pixels and the second set of pixels.

11. The computer-implemented method of claim 10, further comprising:

determining information regarding an appearance of the object based at least in part on the first portion of the first image, wherein the information regarding the appearance comprises at least one of a first color, a first texture or a first outline of the object within the first portion of the first image, wherein identifying the second portion of the second image comprises:

recognizing the at least one of the first color, the second color or the first texture within the second portion of the second image, and wherein generating the second annotation of the second image comprises:

generating the second annotation based at least in part on the at least one of the first color, the first texture, or the first outline.

12. The computer-implemented method of claim 10, further comprising:

training at least one tracking algorithm to recognize the object based at least in part on at least one of the first set of pixels or the second set of pixels;

predicting, by the at least one tracking algorithm, a second position of the object in three-dimensional space at a second time;

identifying a third portion of a third image captured by the first imaging device at approximately the second time;

generating a third annotation of the third image based at least in part on the third portion of the third image; and storing the third annotation in association with the third image in the at least one data store.

13. The computer-implemented method of claim 3, further comprising:

causing a display of at least the first image and the second image in a user interface on at least one computer display, wherein the designation of the first portion of the first image is received via at least one of the user interface or the at least one computer display; and in response to generating the second annotation of the second image, causing a display of the second annotation on the at least one computer display, wherein the second annotation is displayed in association with the second portion of the second image.

14. The computer-implemented method of claim 3, further comprising:

recognizing at least a first set of pixels corresponding to a first portion of an object within the first portion of the first image;

calculating a confidence score associated with the second annotation, wherein the confidence score is a measure of confidence that the second portion of the second image depicts at least a second portion of the object;

determining that the confidence score is below a predetermined threshold; and causing a display of a prompt on the user interface, wherein the prompt requests at least one of:

a designation of a third portion of the second image;

a modification to the second annotation; or a deletion of the second annotation.

15. The computer-implemented method of claim 3, wherein each of the first imaging device and the second imaging device is calibrated with respect to one another.

16. A computer system comprising an input device, a data store, a computer display and at least one computer processor, wherein the data store comprises a plurality of video files, wherein each of the plurality of video files comprises a plurality of images captured by one of a plurality of cameras in communication with the computer system, wherein each of the plurality of cameras has a field of view, and wherein the computer system is programmed with one or more sets of instructions that, when executed, cause the computer system to at least:

cause a display of a first image captured at a first time on the computer display, wherein the first image is one of a first plurality of images in a first video file captured by a first camera;

receive a selection of a first portion of the first image on the computer display;

define a first annotation of the first image based at least in part on the selection of the first portion;

recognize at least a portion of an object expressed within the first portion of the first image;

determine a position of the object in three-dimensional space at approximately the first time based at least in part on the first annotation;

identify at least a subset of the plurality of cameras having the position of the object in three-dimensional space within a field of view at approximately the first time;

transpose data regarding the first annotation into each of a second plurality of images captured by each of the plurality of cameras of the subset at approximately the first time;

generate annotations of each of the second plurality of images based at least in part on the data regarding the first annotation; and store each of the annotations in at least one data store, wherein each of the annotations is stored in association with the one of the images which the annotations were generated.

17. The computer system of claim 16, wherein the first annotation identifies a first set of pixels within the first portion of the image depicting the object, and wherein each of the annotations identifies corresponding sets of pixels within portions of the images captured by each of the plurality of cameras of the subset at approximately the first time.

18. The computer system of claim 17, wherein the one or more sets of instructions, when executed, further cause the computer system to at least:

train at least one tracking algorithm to recognize the object based at least in part on sets of pixels within at least two images captured by at least two of the plurality of cameras at approximately the first time, and wherein the at least two sets of pixels comprises the first set of pixels and at least one of the corresponding sets of pixels;

predict, by the at least one tracking algorithm, a position of the object in three-dimensional space at approximately a second time, wherein the second time follows the first time;

identify a third plurality of images, wherein each of the third plurality of images was captured by one of the plurality of cameras having the position of the object in three-dimensional space within a field of view at approximately the second time; and generate annotations of each of the second plurality of images based at least in part on the predicted position of the object in three-dimensional space at approximately the second time.

19. The computer system of claim 16, wherein the selection of the first portion comprises an interaction with at least a portion of the computer display or the first image displayed on the computer display by at least one of a body part, an input/output device, a keyboard, a mouse or a stylus.

20. The computer system of claim 16, wherein each of the plurality of cameras is provided within a materials handling facility, and wherein each of the plurality of cameras includes one or more storage units within a field of view.

* * * * *